(12) United States Patent
Bigdeli et al.

(10) Patent No.: US 12,542,702 B2
(45) Date of Patent: Feb. 3, 2026

(54) DISTRIBUTED TRANSMITTER TOPOLOGY FOR ENHANCED COMMUNICATION SYSTEMS

(71) Applicants: HUAWEI TECHNOLOGIES CANADA CO., LTD., Kanata (CA); la Corporation de l'École Polytechnique de Montréal, Montréal (CA)

(72) Inventors: Yasser Bigdeli, Montreal (CA); Pascal Burasa, Montreal (CA); Ke Wu, Montreal (CA)

(73) Assignees: HUAWEI TECHNOLOGIES CANADA CO., LTD., Kanata (CA); la Corporation de l'École Polytechnique de Montréal, Montréal (CA)

( * ) Notice: Subject to any disclaimer, the term of this patent is extended or adjusted under 35 U.S.C. 154(b) by 30 days.

(21) Appl. No.: 18/422,818

(22) Filed: Jan. 25, 2024

(65) Prior Publication Data

US 2025/0247278 A1 Jul. 31, 2025

(51) Int. Cl.
| | |
|---|---|
| *H04L 27/20* | (2006.01) |
| *H04B 1/00* | (2006.01) |
| *H04L 27/36* | (2006.01) |

(52) U.S. Cl.
CPC ........... *H04L 27/20* (2013.01); *H04B 1/0082* (2013.01); *H04L 27/362* (2013.01)

(58) Field of Classification Search
CPC ..... H04L 27/18; H04L 27/20; H04L 27/2003; H04L 27/32; H04L 27/34; H04L 27/36;
(Continued)

(56) References Cited

U.S. PATENT DOCUMENTS

| | | | | |
|---|---|---|---|---|
| 5,463,355 A | * | 10/1995 | Halloran | H04L 27/2071 375/284 |
| 5,612,651 A | * | 3/1997 | Chethik | H04L 27/362 375/261 |

(Continued)

OTHER PUBLICATIONS

S. Kang, S. V. Thyagarajan and A. M. Niknejad, "A 240GHz wideband QPSK transmitter in 65nm CMOS," 2014 IEEE Radio Frequency Integrated Circuits Symposium, Tampa, FL, USA, 2014, pp. 353-356.

(Continued)

*Primary Examiner* — James M Perez

(57) ABSTRACT

Apparatus, systems, and methods for a transmitter array for enhanced communication systems may be provided. According to an aspect a transmitter array may be provided. The transmitter array may include a plurality of equivalent transmitter units. Each equivalent transmitter unit may include an antenna and a QPSK modulator. Each equivalent transmitter unit may be selectively activatable. In some embodiments, upon activation of a set of equivalent transmitter units selected from the plurality of equivalent transmitter units, a desired modulated output signal is generated. According to another aspect, a method of generating a desired modulated output signal may be provided. The method may include receiving a plurality of local oscillator (LO) signals at a transmitter array. The method may further include selectively activating a set of equivalent transmitter units of the plurality of equivalent transmitter units to generate the desired modulated output signal.

20 Claims, 16 Drawing Sheets

(58) Field of Classification Search
CPC ..... H04L 27/362; H04B 1/005; H04B 1/0067; H04B 1/0082
See application file for complete search history.

(56) References Cited

U.S. PATENT DOCUMENTS

| | | | | |
|---|---|---|---|---|
| 5,815,531 | A * | 9/1998 | Dent | H04L 27/362 375/297 |
| 5,867,071 | A * | 2/1999 | Chethik | H03C 3/40 375/264 |
| 5,917,384 | A * | 6/1999 | Chethik | H04L 27/362 375/261 |
| 6,459,832 | B1 * | 10/2002 | Smith | H04J 14/026 398/43 |
| 7,362,824 | B1 * | 4/2008 | Murakami | H04L 27/0008 375/302 |
| 9,548,541 | B2 * | 1/2017 | Djerafi | H01Q 21/064 |
| 9,755,286 | B2 * | 9/2017 | Wang | C04B 35/10 |
| 9,847,802 | B1 * | 12/2017 | Farley | H04B 1/0483 |
| 9,929,768 | B2 * | 3/2018 | Li | H04L 5/14 |
| 9,973,362 | B2 * | 5/2018 | Jia | H04B 7/0452 |
| 9,992,722 | B2 * | 6/2018 | Li | H04L 5/14 |
| 10,116,396 | B1 * | 10/2018 | Wu | H04B 7/08 |
| 10,147,991 | B1 * | 12/2018 | Wu | H01P 1/32 |
| 10,396,936 | B1 * | 8/2019 | Mnasri | H04B 1/7097 |
| 10,401,467 | B2 * | 9/2019 | Moghaddasi | G01S 3/48 |
| 10,432,356 | B2 * | 10/2019 | Yuan | H04L 1/0009 |
| 10,530,060 | B2 * | 1/2020 | Wu | H01Q 1/38 |
| 10,547,118 | B2 * | 1/2020 | Guntupalli | H01Q 15/08 |
| 10,564,249 | B2 * | 2/2020 | Djerafi | H01Q 3/40 |
| 10,637,161 | B2 * | 4/2020 | Wu | H01Q 21/061 |
| 10,670,810 | B2 * | 6/2020 | Sakr | H01Q 25/001 |
| 10,750,451 | B2 * | 8/2020 | Du | H04W 52/02 |
| 11,177,995 | B2 * | 11/2021 | Ferdinand | H04L 27/2607 |
| 11,333,682 | B2 * | 5/2022 | Zhu | G01R 1/06794 |
| 11,394,597 | B2 * | 7/2022 | Mohammadnezhad | H04L 27/0008 |
| 11,509,031 | B2 * | 11/2022 | Zhou | H01P 1/212 |
| 11,533,069 | B2 * | 12/2022 | Wu | H04B 1/0075 |
| 11,968,073 | B2 * | 4/2024 | Mohammadnezhad | H04L 27/361 |
| 12,184,085 | B2 * | 12/2024 | Dyab | H01P 5/103 |
| 2003/0095012 | A1 * | 5/2003 | Chethik | H04L 27/361 332/103 |
| 2004/0081253 | A1 * | 4/2004 | Chethik | H04L 27/362 375/308 |
| 2004/0091060 | A1 * | 5/2004 | Becker | H04L 27/0008 375/298 |
| 2006/0270427 | A1 * | 11/2006 | Shida | H04L 1/0001 455/512 |
| 2007/0260958 | A1 * | 11/2007 | Li | H04L 1/0048 714/755 |
| 2008/0123752 | A1 * | 5/2008 | Chen | H04L 27/362 375/240.26 |
| 2008/0267306 | A1 * | 10/2008 | Batra | H04L 25/03171 375/262 |
| 2009/0201849 | A1 * | 8/2009 | Sawahashi | H04B 7/0697 375/267 |
| 2012/0280844 | A1 * | 11/2012 | Abe | H03M 1/1061 341/118 |
| 2014/0035693 | A1 * | 2/2014 | Li | H04L 27/32 332/103 |
| 2015/0139293 | A1 * | 5/2015 | Stanwood | H04L 27/04 375/259 |
| 2017/0318589 | A1 * | 11/2017 | Negus | H04W 72/04 |
| 2018/0145792 | A1 * | 5/2018 | Murakami | H03M 13/15 |
| 2020/0007217 | A1 * | 1/2020 | Taherzadehboroujeni | H04B 7/0697 |
| 2020/0112384 | A1 * | 4/2020 | Yu | H04B 7/0413 |
| 2020/0145069 | A1 * | 5/2020 | Ferrante | H04B 7/0608 |
| 2020/0203845 | A1 * | 6/2020 | Bayat-Makou | H01Q 13/22 |
| 2021/0218614 | A1 * | 7/2021 | Mohammadnezhad | H04L 27/0008 |
| 2021/0243065 | A1 * | 8/2021 | Ferdinand | H04L 27/2653 |
| 2021/0285985 | A1 * | 9/2021 | Zhu | G01R 1/06755 |
| 2022/0321393 | A1 * | 10/2022 | Mohammadnezhad | H04L 27/361 |
| 2025/0247278 | A1 * | 7/2025 | Bigdeli | H04L 27/20 |

OTHER PUBLICATIONS

H. Wang, H. Mohammadnezhad and P. Heydari, "Analysis and Design of High-Order QAM Direct-Modulation Transmitter for High-Speed Point-to-Point mm-Wave Wireless Links," in IEEE Journal of Solid-State Circuits, vol. 54, No. 11, pp. 3161-3179, Nov. 2019.

C. Jiang, A. Cathelin and E. Afshari, "A High-Speed Efficient 220-GHz Spatial-Orthogonal ASK Transmitter in 130-nm SiGe BiCMOS," in IEEE Journal of Solid-State Circuits, vol. 52, No. 9, pp. 2321-2334, Sep. 2017.

* cited by examiner

PRIOR ART

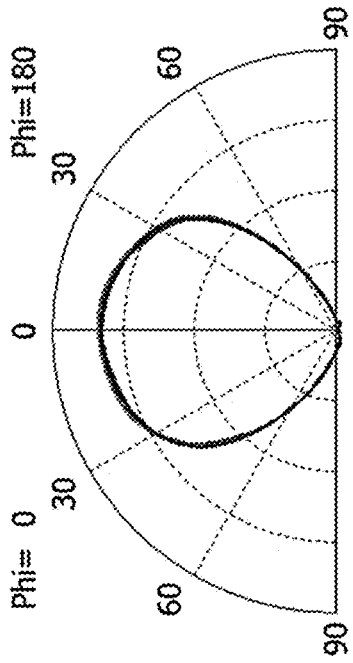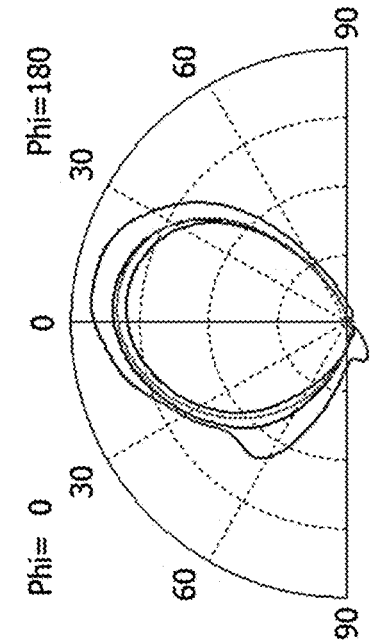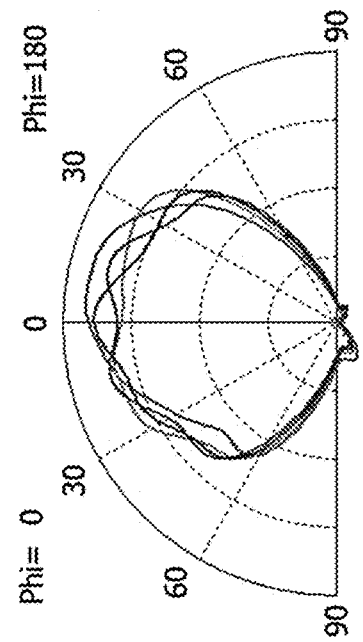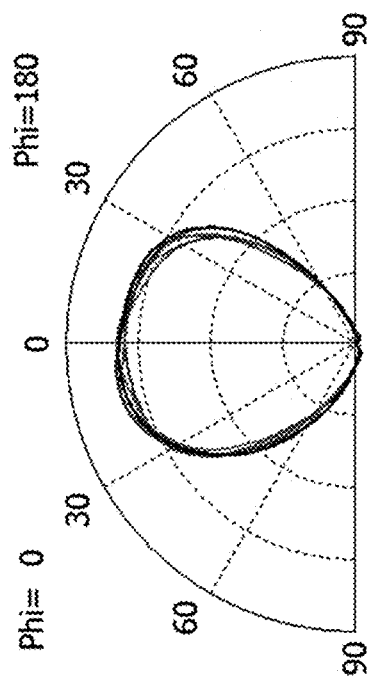
FIG. 7B

1300

1301. Receiving a plurality of local oscillator (LO) signals at a transmitter array, the transmitter array comprising a plurality of equivalent transmitter units, each equivalent transmitter unit selectively activatable and comprising an antenna and a quadrature phase shift keying (QPSK) modulator.

1302. Selectively activating a set of equivalent transmitter units of the plurality of equivalent transmitter units to generate the desired modulated output signal

FIG. 13

DISTRIBUTED TRANSMITTER TOPOLOGY FOR ENHANCED COMMUNICATION SYSTEMS

CROSS-REFERENCE TO RELATED APPLICATIONS

This is the first application filed for the present invention.

FIELD OF THE INVENTION

The present invention pertains to the field of wireless communication systems and technologies, and in particular to a distributed transmitter topology for enhanced communication systems and associated systems, methods and apparatus.

BACKGROUND

The rapid development of communication systems is steering toward the next generation, with a focus on millimeter-wave (mmW) 5G and 6G systems designed to enable low-latency, high data rate communication. However, these advancements pose challenges, including challenges in the realm of transistor fabrication imperfections at high-mmW frequencies. The low transconductances at these frequencies can distort power generation efficiency, leading to significant power consumption issues, especially at high data rates. Existing solutions, while tackling some issues, are not without limitations. Some solutions exhibit high power consumption, negatively impacting budget management, while others are confined to low-order modulations, limiting their adaptability to the dynamic communication landscape. Moreover, solutions enabling high-order modulations often face scalability issues, intricate designs to accommodate high voltage ratios, fixed QAM orders, power inefficiency and incompatibility with large array realizations. Some solutions also suffer from poor performance and inefficient utilization of complex lanes, resulting in higher error vector magnitude (EVM) in the receiver.

Therefore, there is a need for a distributed transmitter topology for enhanced communication systems and associated systems, methods and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Apparatus, systems, and methods for a transmitter array for enhanced communication systems may be provided. According to an aspect, a transmitter array is provided. The transmitter array includes a plurality of equivalent transmitter units. Each equivalent transmitter unit includes an antenna and a quadrature phase shift keying (QPSK) modulator. Each equivalent transmitter unit may be selectively activatable. In some embodiments, upon activation of a set of equivalent transmitter units selected from the plurality of equivalent transmitter units, a desired modulated output signal is generated. The transmitter array may provide a practical structure for implementing large active transmit arrays across a broad range of frequencies, including millimeter-wave (mmW) and sub-terahertz (THz) bands. This transmitter array may function dynamically, as each transmitter unit can be independently controlled, thereby enabling the generation of a desired modulated signal. The design may also promote improved power efficiency and management by reducing the need for digital-to-analog converters (DACs) in the transmission chain. Additionally, it may reduce the power back-off from amplifiers, allowing them to operate closer to their optimal efficiency and power levels. The uniform nature of the transmitter units may reduce fabrication errors, allow for scalability, and preserve symmetry.

In some embodiments, the transmitter array further includes one or more power generation units for generating a local oscillator (LO) signal at each equivalent transmitter unit. In some embodiments, the plurality of equivalent transmitter units may be organized into one or more groups of equivalent transmitter units. Each group of equivalent transmitter units may include one or more equivalent transmitter units and correspond to a power generation unit of the one or more power generation units. In some embodiments, each equivalent transmitter unit of each group of equivalent transmitter units is configured to receive the LO signal of the power generation unit corresponding to said each group of equivalent transmitter units.

In some embodiments, each equivalent transmitter unit of the plurality of equivalent transmitter units further includes a power generation unit for generating a local oscillator (LO) signal at said each equivalent transmitter unit.

In some embodiments, each equivalent transmitter unit of the plurality of equivalent transmitter units further includes a power amplifier for amplifying an output of the corresponding QPSK modulator.

In some embodiments, each equivalent transmitter unit of the set of equivalent transmitter units is selectively activated by modulating, via the corresponding QPSK modulator, a local oscillator (LO) signal to generate a corresponding modulated output signal.

In some embodiments, the selective activation of each equivalent transmitter unit of the set of equivalent transmitter units is based on receiving, at the corresponding QPSK modulator, digital data bits for modulating the LO signal. The digital data bits may indicate a phase state of the corresponding modulated output signal, the phase state being one of: 45, 135, 225, and 315 degrees.

In some embodiments, the desired modulated output signal corresponds to a symbol in a quadrature amplitude modulation (QAM) constellation generated based on: a number of equivalent transmitter units in the set of equivalent transmitter units, and phase state of a corresponding modulated output signal of each equivalent transmitter unit of the set of equivalent transmitter units.

According to another aspect, a method is provided for generating a desired modulated output signal. The method includes receiving a plurality of local oscillator (LO) signals at a transmitter array. The transmitter array may include a plurality of equivalent transmitter units. Each equivalent transmitter unit may be selectively activatable and include an antenna and a quadrature phase shift keying (QPSK) modulator. The method further includes selectively activating a set of equivalent transmitter units of the plurality of equivalent transmitter units to generate the desired modulated output signal.

In some embodiments, selectively activating the set of equivalent transmitter units of the plurality of equivalent transmitter units to generate the desired modulated output signal includes generating a set of modulated output signals by selectively activating each equivalent transmitter unit of the set of equivalent transmitter units to generate a corresponding modulated output signal of the set of modulated output signals. In some embodiments, selectively activating the set of equivalent transmitter units of the plurality of equivalent transmitter units to generate the desired modulated output signal further includes combining the set of modulated output signals to generate the desired modulated output signal.

In some embodiments, the plurality of LO signals are received from one or more power generation units.

In some embodiments, the plurality of equivalent transmitter units are organized into one or more groups of equivalent transmitter units. Each group of equivalent transmitter units may include one or more equivalent transmitter units and correspond to a power generation unit of the one or more power generation units. In some embodiments, receiving the plurality of LO signals at the transmitter array includes receiving, at each equivalent transmitter unit of each group of equivalent transmitter units, an LO signal of the plurality of LO signals from the power generation unit corresponding to each group of equivalent transmitter units.

In some embodiments, each equivalent transmitter unit of the plurality of equivalent transmitter units further includes a power generation unit. In some embodiments, receiving the plurality of LO signals at the transmitter array includes receiving, at each equivalent transmitter unit of the plurality of equivalent transmitter units, an LO signal from the corresponding power generation unit.

In some embodiments, each equivalent transmitter unit of the plurality of equivalent transmitter units further includes a power amplifier for amplifying an output of the corresponding QPSK modulator.

In some embodiments, selectively activating each equivalent transmitter unit of the set of equivalent transmitter units to generate a corresponding modulated output signal of the set of modulated output signals includes receiving, at a corresponding modulator of said each equivalent transmitter unit, digital data bits for modulating an LO signal of the plurality of LO signals to selectively activate each equivalent transmitter unit. In some embodiments, selectively activating each equivalent transmitter unit of the set of equivalent transmitter units to generate a corresponding modulated output signal of the set of modulated output signals further includes modulating, by the corresponding QPSK modulator, the LO signal to generate the corresponding modulated output signal based on the digital data bits. The digital data bits may indicate a phase state of the corresponding modulated output signal, the phase state being one of: 45, 135, 225, and 315 degrees.

In some embodiments, the desired modulated output signal corresponds to a symbol in a quadrature amplitude modulation (QAM) constellation generated based on: a number of equivalent transmitter units in the set of equivalent transmitter units, and a phase state of a corresponding modulated output signal of each equivalent transmitter unit of the set of equivalent transmitter units.

According to another aspect, an apparatus is provided. The apparatus includes modules or electronics configured to perform one or more of the methods and systems described herein.

According to one aspect, an apparatus is provided, where the apparatus includes: a memory, configured to store a program; a processor, configured to execute the program stored in the memory, and when the program stored in the memory is executed, the processor is configured to perform one or more of the methods and systems described herein.

According to another aspect, a computer readable medium is provided, where the computer readable medium stores program code executed by a device and the program code is used to perform one or more of the methods and systems described herein.

According to one aspect, a chip is provided, where the chip includes a processor and a data interface, and the processor reads, by using the data interface, an instruction stored in a memory, to perform one or more of the methods and systems described herein. Aspects may further include the memory.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 7B illustrates radiation pattern of select antennas of the array of FIG. 7A, according to an embodiment.

FIG. 13 illustrates a method of generating a desired modulated output signal, according to an embodiment.

It will be noted that throughout the appended drawings, like features are identified by like reference numerals.

DETAILED DESCRIPTION

Figure 1:
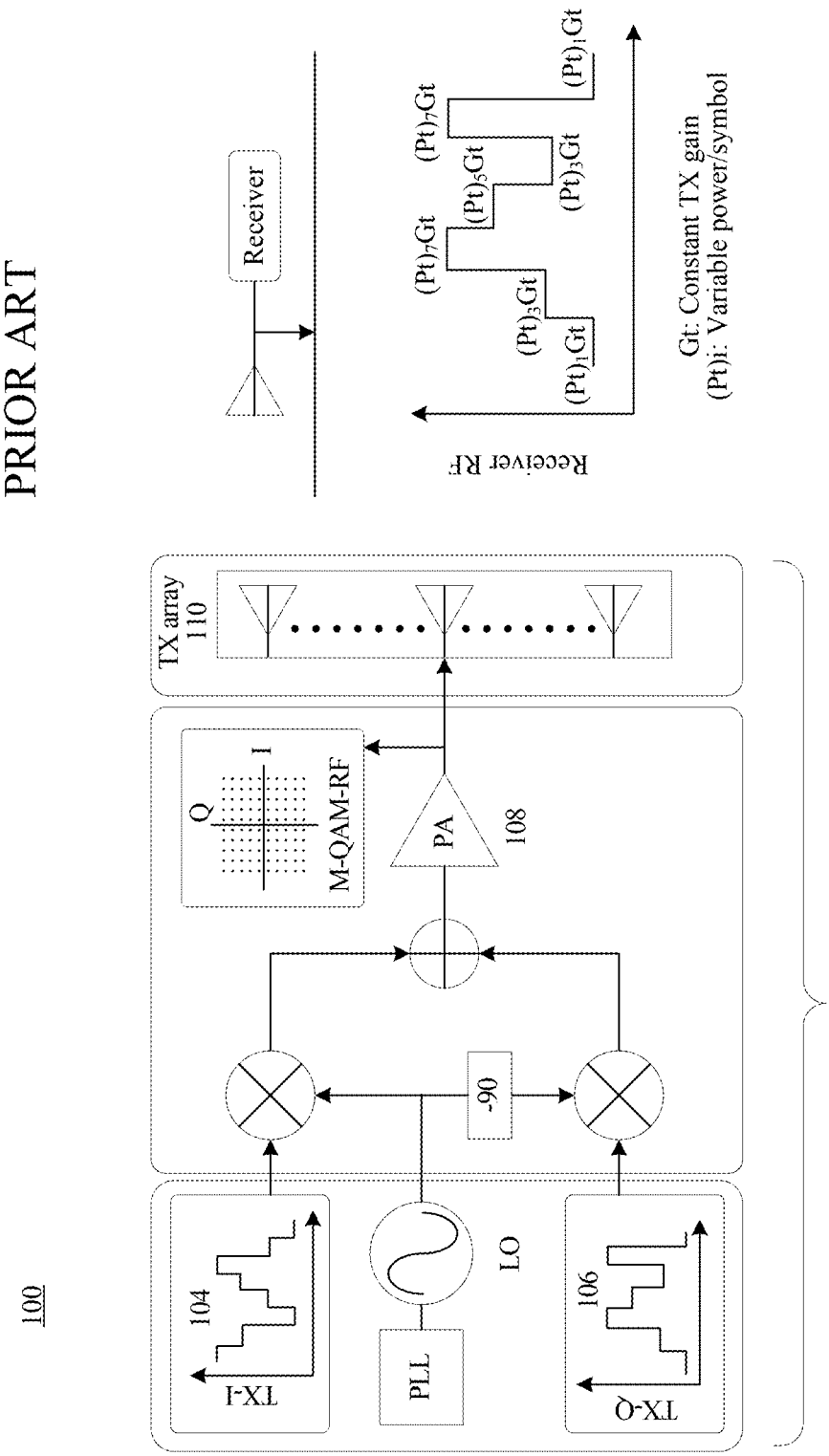
FIG. 1 illustrates a block diagram of a transmitter conventionally used in state-of-the-art (SoA) communication systems.

Apparatus, systems, and methods for a transmitter array for enhanced communication systems are provided. According to an aspect a transmitter array may be provided. The transmitter array may be based on a topology 300, 1000, 1100 or 1200 as described herein. The transmitter array may include a plurality of equivalent transmitter units. Each equivalent transmitter unit may include an antenna and a QPSK modulator. Each equivalent transmitter unit may be selectively activatable. In some embodiments, upon activation of a set of equivalent transmitter units selected from the plurality of equivalent transmitter units, a desired modulated output signal is generated.

According to another aspect, a method 1300 of generating a desired modulated output signal may be provided. The method may include receiving a plurality of local oscillator (LO) signals at a transmitter array. The transmitter array may include a plurality of equivalent transmitter units. Each equivalent transmitter unit may be selectively activatable and include an antenna and a QPSK modulator. The method may further include selectively activating a set of equivalent transmitter units of the plurality of equivalent transmitter units to generate the desired modulated output signal.

The steady developments toward next generation communication systems, namely, millimeter-wave (mmW)-5G and 6G systems, target low latency and high data rate communication to support applications such as smart cities, machine internet, integrated wireless functionality, automation, and so on. Incorporating major frequency shift from microwave frequencies into mmW and sub-terahertz (THz) frequencies may contribute to several advantages, including high integration, wide bandwidth, high data rate and improved spatial resolution for sensing systems, and more.

However, at high-mmW (>100 GHz) frequencies, from radio frequency (RF) point of view, transistor fabrication imperfections such as overlaps, propagation delay, and dielectric and conductance losses can generate strong parasitic elements which degrade performance parameters. Specifically, low transconductance distorts power generation efficiency in gain stages and imposes high restriction on power amplifiers (PAs). The resulting low power level is one of the bottle necks to extend the range in mmW communication systems. Also, topologically, state-of-the-art (SoA) transmitters rely on digital-to-analog converters (DAC) for high integration and complex waveform generation (e.g., orthogonal frequency division multiplexing (OFDM), and code division multiple access (CDMA) modulations). Power consumption linearly increases in DACs with data rate and bandwidth. SoA implementations typically report multi-watts consumption for multi-Gbps data rates. Targeted high-data rate in mmW-5G and 6G standards can challenge DACs for power management, especially in battery operated devices. Particularly, in the context of popular large multi-output transmit active arrays, incorporation of multiple DACs can become unfeasible.

Peak to average power ratio (PAPR) varies for different waveforms and sets a measure for a PA to back off from its peak power, which can considerably drop the PA's output power and efficiency. Typically, 6-20 dB back off for various waveforms is required to preserve linearity. Different techniques are devised to minimize PAPR, such as coding and bit sequencing. However, minimum PAPR comes with simpler modulations which impose less variation on the signal. The quadrature phase shift keying (QPSK) modulation is a simple quadrature waveform with low power back off (approaching to zero) requirements. Avoiding complex waveforms, especially for high-mmW and THz frequency bands operation may be beneficial to improve the output power level and efficiency.

In recent years, to confront power consumption issues in low power applications, "application specific" silicones have been developed to replace general purpose front ends in which, performance is optimized for the given task. Artificial intelligence hardware accelerators are a known example in digital electronics. One or more aspects of the instant application considers RF front-end design with a realization of a transmission active array and a desire for optimization thereof for mmW and THz high-data rate and power efficient operation.

Beamforming techniques are commonly used to compensate for budget link deficiencies from low power level and high free space loss in mmW and THz frequency bands. Scaling up to high-mmW and THz frequencies, however, increases transmission losses (e.g., ohmic loss and radiation loss) and unbalances local oscillator (LO) phase values distribution in feed networks, which may further deteriorate beamforming and overall efficiency. In this regard, topologies with large array scalability can become of interest. One or more aspects of the instant application may provide for a topology compatible with large array requirement. One or more aspects of the instant application may allow for improved or optimized overall power consumption based on removing DAC from transmitter chain and pushing PA toward its optimized operation region.

FIG. 1 illustrates a block diagram of a transmitter conventionally used in SoA communication systems. As illustrated, transmitter 102 requires two DACs 104 and 106 for in-phase and quadrature channels. Then, after up-conversion via respective carriers, the accumulated outcome is fed to PA 108 and then to the antenna (or array of antennas) 110. This topology 100 suits the most conventional low-mid data rate (<Gbps) applications due to hardware integration and DAC generality to implement advanced modulation techniques.

However, in the context of high data rate communication at high-mmW and THz frequencies where translating bandwidth to data rate goes beyond multi-Gbps and DACs' handling capability. In this regard, methods based on direct modulation (RF modulation) techniques are reported. Direct modulators may refer to switches and passive connection circuits, which may be useful for high data switching and may require low power consumption.

Figure 2B:
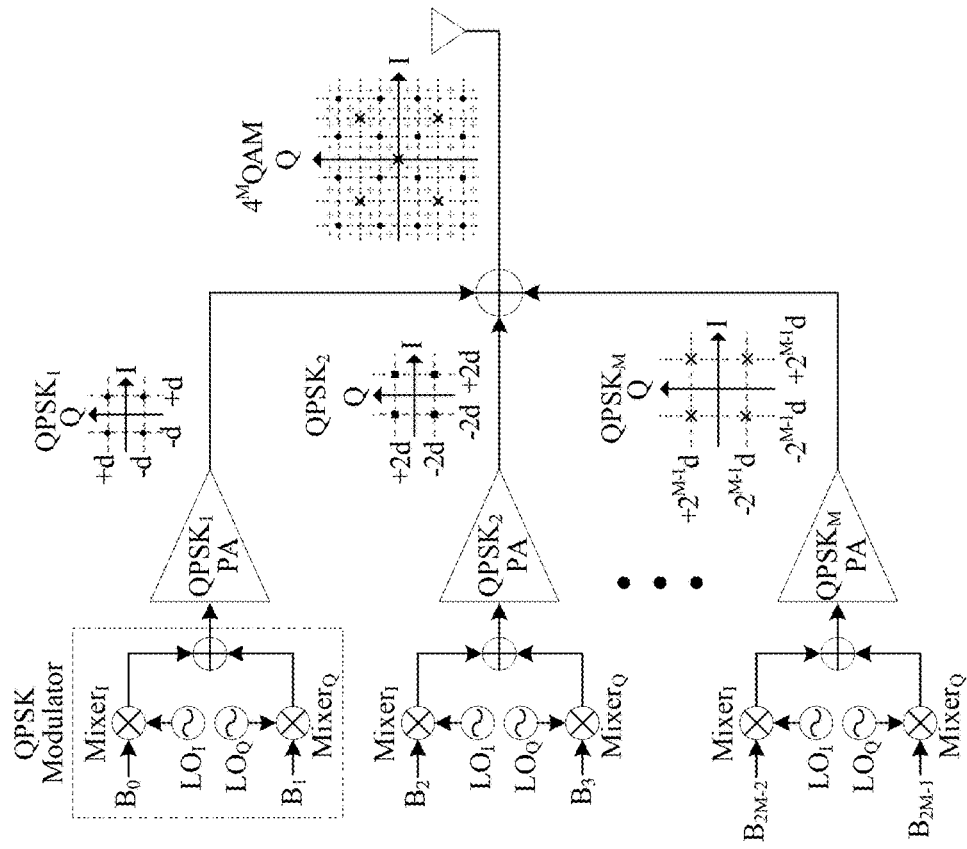
FIG. 2B illustrates multiple QPSK modulators combined to generate higher order QAM constellations.
Figure 2A:
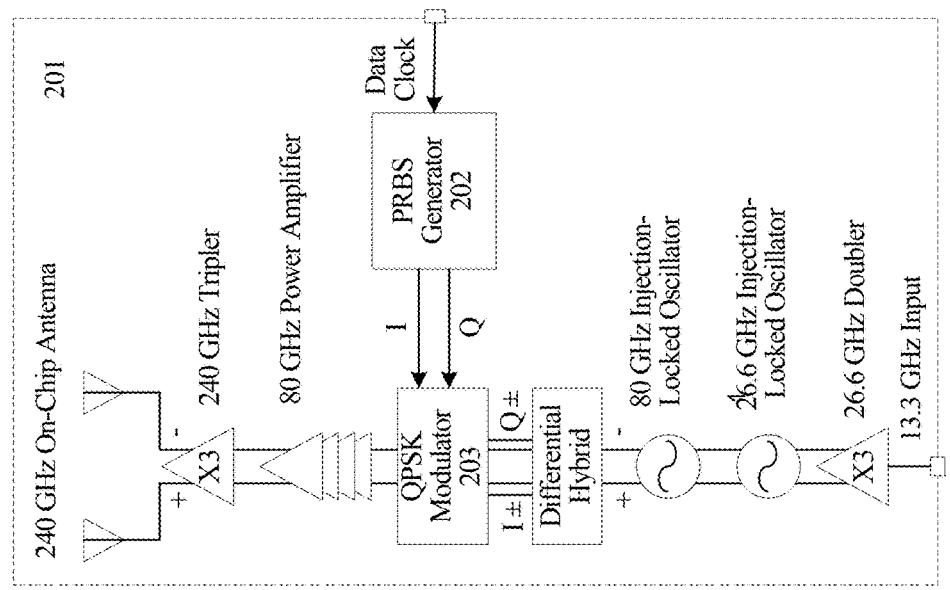
FIG. 2A illustrates a block diagram of a 240 GHz QPSK transmitter.

FIG. 2A illustrates a block diagram of a 240 GHz QPSK transmitter 201. As shown in FIG. 2A, the monotone local oscillator (LO) signal is phased modulated to four 90 degree separated phases to form a QPSK signal. In contrast to conventional systems, as in FIG. 1, the time varying intermediate frequency (IF) signal generated by DACs is replaced by a digital data stream directly generated by a processing unit, the pseudo-random binary sequence (PRBS) generator 202. The I and Q data lines generate four possible sequences ([00, 01, 10, 11]) which through the QPSK modulator 203 translate to four phases at QPSK modulation scheme ([45, 135, 225, 315]). The quantized nature of QPSK digital modulation allows for direct digital data injection. Hower, QPSK transmitter 201 is limited to low order modulation. Modern communication systems need higher order modulation systems, like 1024 QAMs to accommodate high data rate in limited bandwidth.

FIG. 2B illustrates multiple QPSK modulators combined to generate higher order QAM constellations. In FIG. 2B, a group of QPSK modulators are used to extend the performance of the direct modulation transmitter 201 from low order modulation to a higher order modulation (QAM constellation generation). As conceptually shown in FIG. 2B, for instance, for a 64QAM, three QPSK modulation units with relative amplitudes of 1×, 2×, and 4× are required to combine their outputs. Higher QAM orders can be obtained by using a higher number of modulators with respective amplitude ratios. In FIG. 2B, the QPSK modulators are interdependent with respect to their power levels to obtain higher order QAM constellations and their combined output is based on this interdependency.

Figure 2C:
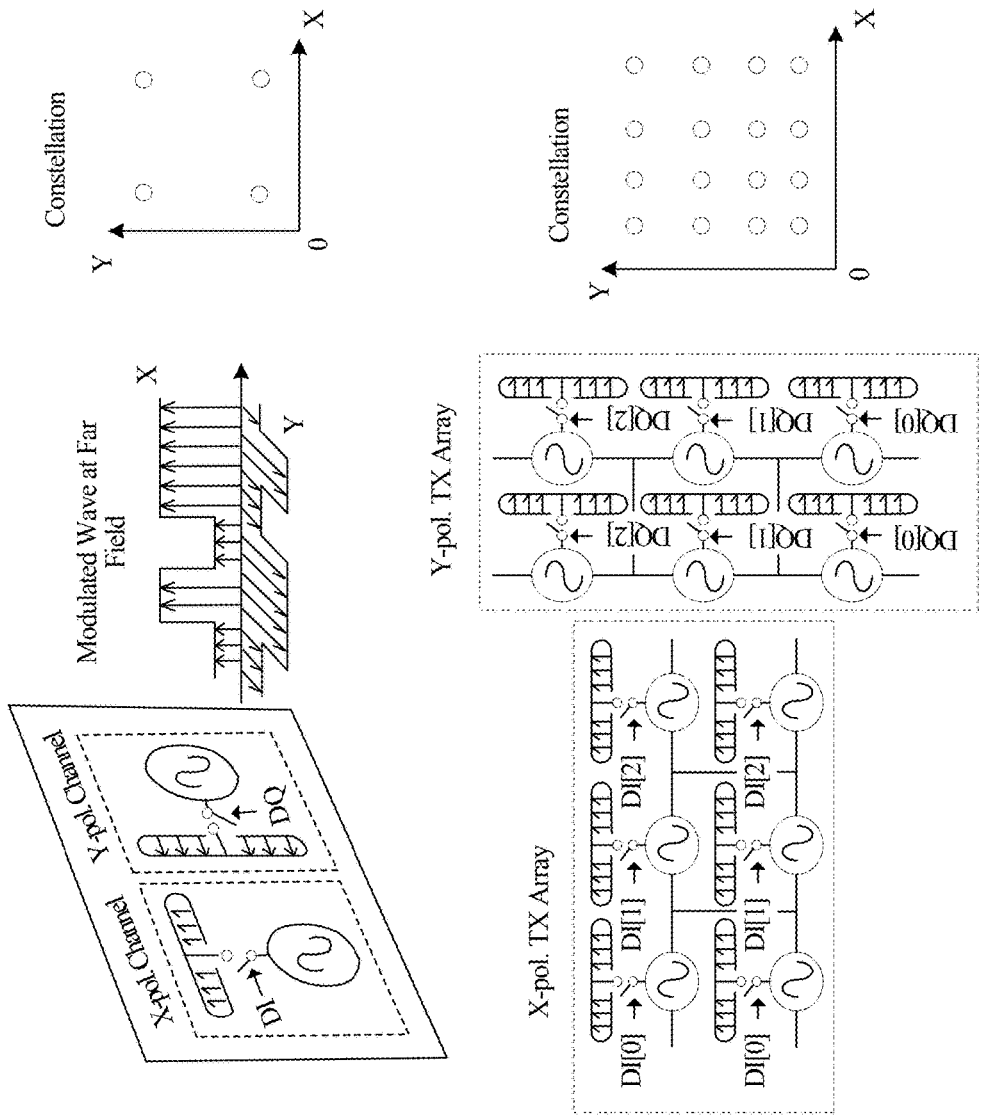
FIG. 2C illustrates a distributed transmitter array with spatially orthogonal amplitude shift-keying (SO-ASK) modulation.

FIG. 2C illustrates a distributed transmitter array with spatially orthogonal amplitude shift-keying (SO-ASK) modulation. As shown in FIG. 2C, every unit in the array contains an oscillator (a power generation unit), a switch and an antenna, which forms the standalone transmit unit. Each transmit unit is capable of on-off keying (OOK) modulation generation, and by arraying transmit units in X and Y polarizations higher order constellation may be generated through spatial power combination. In FIG. 2C, when the transmitter array transmits a signal, all transmit units of the transmitter array are activated, where each unit is activated as ON state representing a binary '1' or as OFF state representing a binary '0'. Structural simplicity and distributed power generation make the distributed transmitter array of FIG. 2C an appropriate topology for low power, large array implementations.

According to one or more aspects, the direct-modulation technique may be used within a distributed large array structure to provide a transmitter topology with robust variable high-order QAM modulation generation capability. The provided transmitter topology may inherit advantages of array beamforming with improved power efficiency.

For high data rate and low power applications, DAC units become one of the major sources of power consumption and complexity. Typically, for data rates in the multi-gigabit per second range, multi watt power consumption is reported in the literature. The high-power consumption of DAC units, central signal generation and passive distribution (feed network) nature of conventional systems makes them inefficient and potentially incapable of maximizing link budget to extend wireless communication distance for a constant data rate.

The realization of FIG. 2A is a form of direct modulation and, inherently, is spectrally inefficient. Further, transmitter 201 of FIG. 2A is limited to low order modulation, where current communication systems require higher order modulation systems. Higher order QAM modulation multiplies the data rate for a constant bandwidth and may be necessary for communication systems.

The structure of FIG. 2B, despite its capability of generating higher order QAM modulation, faces scalability drawbacks. The method of generating higher order QAM modulation based on the structure of FIG. 2B may be difficult to scale for high orders of QAM modulation. For instance, a 1024-QAM modulation, according to the structure of FIG. 2B, requires 5 QPSK modules with relative amplitudes of 1×, 2×, 4×, 8×, and 16×. The high voltage ratio makes the overall system susceptible to error and challenging to calibrate. Also, the high voltage ratio requirement adds complexity to stages to generate such voltage ratios as transistors' transfer phase varies by their biasing point, or alternatively, in the design of transformer stages with given ratios. Another limitation of the structure of FIG. 2B is the lack of constellation order versatility. The topology of FIG. 2, after implementation, is fixed for the designed QAM order. It may be possible to lower the order, but lowering the order may come at the cost of power efficiency. Further, the topology is likely not compatible with large array realization, as it requires conventional central signal generation and a feed network.

With respect to the structure of FIG. 2C, while relatively simple, this structure has clear performance drawbacks. It is to be understood that SO-ASK in comparison to QAM, only occupies one quarter of the complex plane. Hence, for the same data rate, the structure of FIG. 2C may mandate much higher error vector magnitude (EVM) in the receiver. Also, the structure of FIG. 2C occupies two orthogonal polarizations, which potentially can be used for another channel.

It has been realized that as a whole, the SoA topologies lack simultaneous compatibility with large array realization in terms of power consumption feasibility, practical complexity level, and spectrally efficient constellation transmission capabilities.

Figure 3:
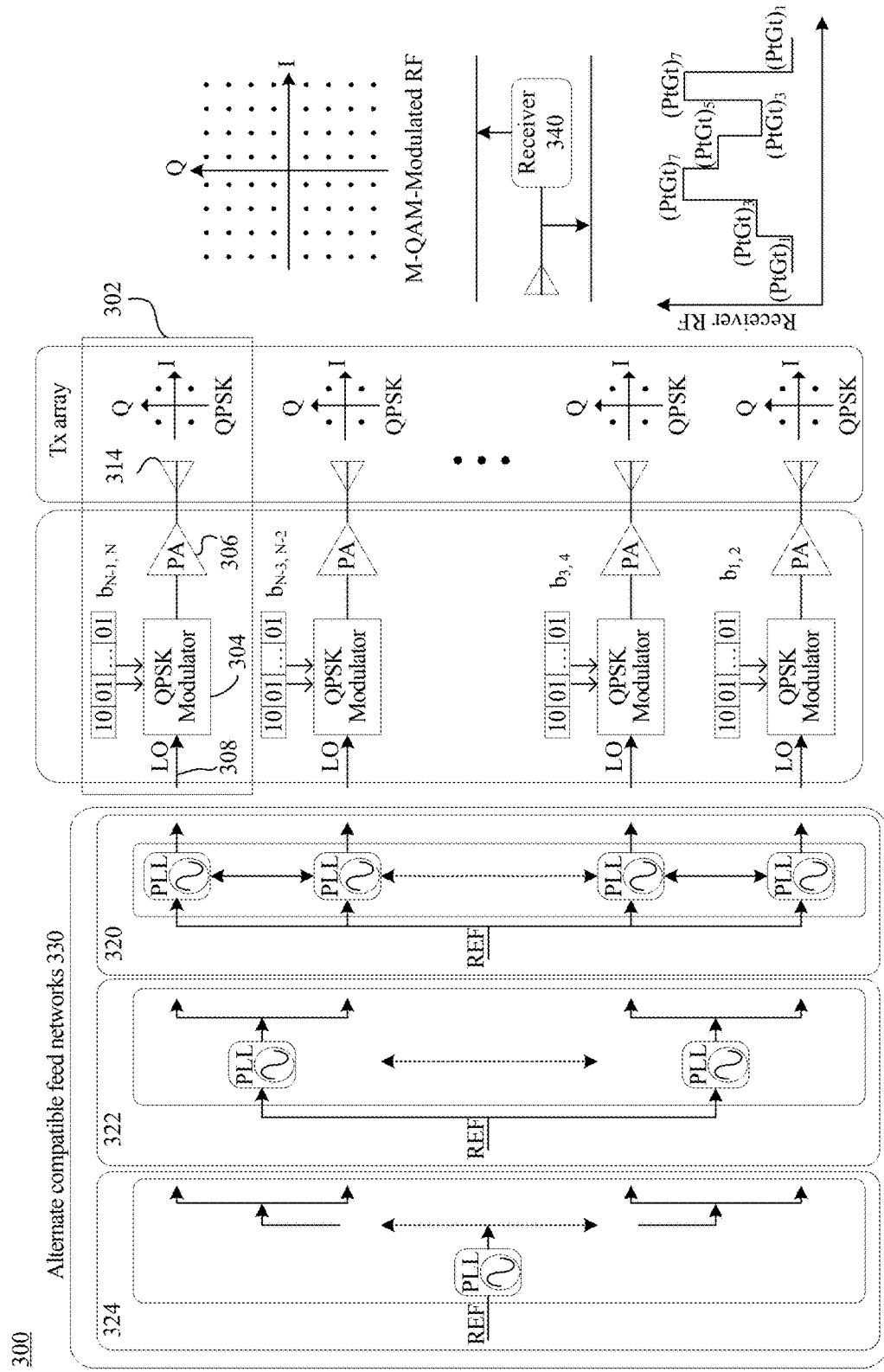
FIG. 3 illustrates a topology of a transmitter array, according to an embodiment.

FIG. 3 illustrates a topology of a transmitter array, according to an embodiment. In some embodiments, topology 300 may be a distributed direct transmitter topology. In some embodiments, topology 300 may apply to large array millimeter wave communication systems. Illustrated topology 300 is a one-dimensional array, providing a schematic layout of the transmitter's configuration. The same concept, e.g., the same topology, may apply for two-dimensional arrays as well. Topology 300 may be formed by a plurality of equivalent or identical transmitter units, e.g., transmitter unit 302. Each equivalent transmitter unit 302 may include one or more of: a QPSK modulator or modulation module 304, a PA 306, an LO signal 308 (non-modulated, monotone LO signal, or carrier signal), and an antenna 314. In some embodiments, each equivalent transmitter unit may be equivalent or identical in all or substantially all physical aspects, and thus each equivalent transmitter unit may include one or more same separate components including one or more of: QPSK modulator, PA, LO signal, antenna, and PA. In some embodiments, each equivalent transmitter unit may have a direct connection to a corresponding antenna, thereby allowing for versatility on location optimization for beamforming and improved budget link management.

A single processing unit can be used to generate and process the digital data for the transmitter array. Thus, a shared processor handles the data for all transmitter units. The data stream handled by this processor is labeled with designations like b1, b2, . . . , bN, representing bits of a long register data unit. These labels could correspond to data sizes like 64, 128, 256 bits, etc. At a given moment, each modulator unit in the array receives a specific portion of data-in this case, 2 bits. The interval at which these bits are received by each modulator unit is equal to the symbol rate. The symbol rate refers to the rate at which symbols (in this context, bits of data) are transmitted.

In some embodiments, each equivalent transmitter unit is selectively activatable or independently controllable. In some embodiments, the selective activation or independent control of each equivalent transmitter unit is done at the modulator stage. In some embodiments, one or more equivalent transmitter units are selectively activated by receiving, at the corresponding one or more modulators, digital data inputs from a processor unit for modulating a corresponding one or more LO signals. The receipt or non-receipt of digital data inputs may indicate the state of activation (e.g., On or Off) of an equivalent transmitter unit, where the receipt of digital data inputs at a corresponding modulator of an equivalent transmitter unit may indicate that the equivalent transmitter unit is selected for activation, and the non-receipt of the digital data inputs at the corresponding modulator of an equivalent transmitter unit may indicate that the equivalent transmitter unit is not selected for activation. The digital data inputs may indicate the output phase of the equivalent transmitter unit, which may be one of four [45, 135, 225, 315] possibilities. Accordingly, an equivalent transmitter unit may be selectively activated by sending digital data inputs, via the processor unit, to a corresponding modulator of the equivalent transmitter unit. The selectively activated equivalent transmitter unit may then modulate a corresponding LO signal according to the received digital data bits to generate a corresponding modulated output signal.

In some embodiments, the methodology for selectively activating or deactivating a transmitter unit is contingent upon implementation of the modulator. Modulators can incorporate two differential switches. These switches can play a role in managing the signal flow from input to output. When the differential inputs to these switches are not actively set to a defined state (such as zero, one, or a high impedance state), the transmission of input to output is inhibited. This mechanism allows for the selective activation or deactivation of the transmitter units based on the state of the inputs. Certain embodiments utilize field-programmable gate arrays (FPGAs) in implementing these modulators. FPGAs offer the flexibility to program various digital functions, which can be useful for control of the modulator's operation.

An alternative approach to manage the selective activation or deactivation of transmitter units involves the use of a disable pin for each unit. This method provides a straightforward means to control the operational state of individual transmitter units, allowing for their selective activation or deactivation.

In general, regardless of the method employed for controlling the activation state, these embodiments share a common feature in their handling of digital, low-frequency inputs. The specific activation or deactivation technique may not significantly impact the system's performance due to the nature of these inputs. This flexibility in design choices allows for various implementations to achieve the desired operational characteristics of the modulators.

In some embodiments, the LO power may be considered to be locally generated in each equivalent transmitter unit as shown, for example, in 320. In some embodiments, the respective oscillators can be in a coupled oscillator array (COA) configuration or form an independent synthesizer. Alternatively, in some embodiments, for smaller array sizes where LO power distribution is practical, one power generation unit may be used to generate the LO signals for the plurality of transmitter units in the smaller array, as shown, for example, in 324. In some embodiments, a hybrid format 322 with shared power source for multiple equivalent transmitter units may be used to generate the LO signals. The decision of the alternative feed networks 330 may be based on the array size and specific requirements in the application.

In an embodiment, topology 300 represents a transmitter array comprising a plurality of equivalent transmitter units. Each transmitter unit may include an antenna and a QPSK modulator. Each equivalent transmitter unit may be selectively activatable. Thus, each equivalent transmitter may be independently controlled to activate and generate a corresponding modulated output signal. Upon activation of a set of equivalent transmitter units selected from the plurality of equivalent transmitter units, a desired modulated output signal may be generated.

In some embodiments, the transmitter array further includes one or more power generation units for generating an LO signal, at each equivalent transmitter unit. In some embodiments, the plurality of equivalent transmitter units are organized into one or more groups of equivalent transmitter units, where each group of equivalent transmitter units may comprise one or more equivalent transmitter units and corresponds to a power generation unit of the one or more power generation units. Each equivalent transmitter unit of each group of equivalent transmitter units may be configured to receive an LO signal of the power generation unit corresponding to said each group of equivalent transmitter units.

In some embodiments, each equivalent transmitter unit of the plurality of equivalent transmitter units further includes a power generation unit for generating an LO signal at said each equivalent transmitter unit. In some embodiments, each equivalent transmitter unit of the plurality of equivalent transmitter units further includes a PA for amplifying an output of the corresponding QPSK modulator.

In some embodiments, the input power and the output power at each equivalent transmitter unit is equivalent or the same. In some embodiments, each equivalent transmitter unit of the set of equivalent transmitter units is selectively activated by modulating, via the corresponding QPSK modulator, an LO signal to generate a corresponding modulated output signal. In some embodiments, the selective activation of each equivalent transmitter unit of the set of equivalent transmitter units is based on receiving, at the corresponding QPSK modulator, digital data bits for modulation (e.g., from the processor unit). The digital data bits may indicate a phase state of the corresponding modulated output signal, the phase state being one of: 45, 135, 225, and 315 degrees.

In some embodiments, the desired modulated output signal corresponds to a symbol in a quadrature amplitude modulation (QAM) constellation generated based on: a number of equivalent transmitter units in the set of equivalent transmitter units, and phase state of a corresponding modulated output signal of each equivalent transmitter unit of the set of equivalent transmitter units.

To retrieve a symbol of a QAM constellation in the receiver 340, the amplitude and phase should proportionally vary based on the respective symbol's location in the constellation plane. The received power based on the Friis equation may be as follows:

$$P_r = P_t G_t \left[ \frac{G_r \lambda^2}{(4\pi r)^2} \right] \quad (1)$$

where $P_t$ is the transmitted power, and $G_t$ and $G_r$ are transmitter and receiver's antenna gains. $\lambda$ is wavelength in free space, and r is the distance. Based on equation (1), the received power is proportional to $P_tG_r$. In conventional systems, the antenna gain (array factor) is constant and radiated power changes and generates the overall waveform. In contrast, for a transmitter array based on topology of 300, the amplitude variation rises from transmitter gain variation caused by selective activation of respective number of transmitter units, and the phase is based on or a function of the selectively activated transmitter unit phases, each transmitter unit phase taking one of four possible states of QPSK modulation.

Considering array factor for radiated electric field, the overall radiated electric field may be as follows:

$$AF = \sum_{i=1}^{N} A_i G_{vi} e^{j\phi_i} e^{j\vec{k}\cdot\vec{r}} \to \text{broadside} \to AF = A_0 G_v \sum_{i=1}^{N} I_i e^{j\phi_i}, \quad (2)$$

$$A_i = A_0 I_i, I_i \in [0, 1].$$

where $G_{vi}$ may represent antenna's voltage gain and may be considered constant for all antennas. $A_i$ may represent excitation amplitude and $\phi_i$ may represent excitation phase within QPSK values constrains. Further, AF in equation (2) may represent the overall radiated electric field (equivalently transmitted power). As indicated in the broadside (normal to antenna surface), the total electric field may be based on (or may only be a function of) the number of selected active transmitter units and their phases.

Figure 4:
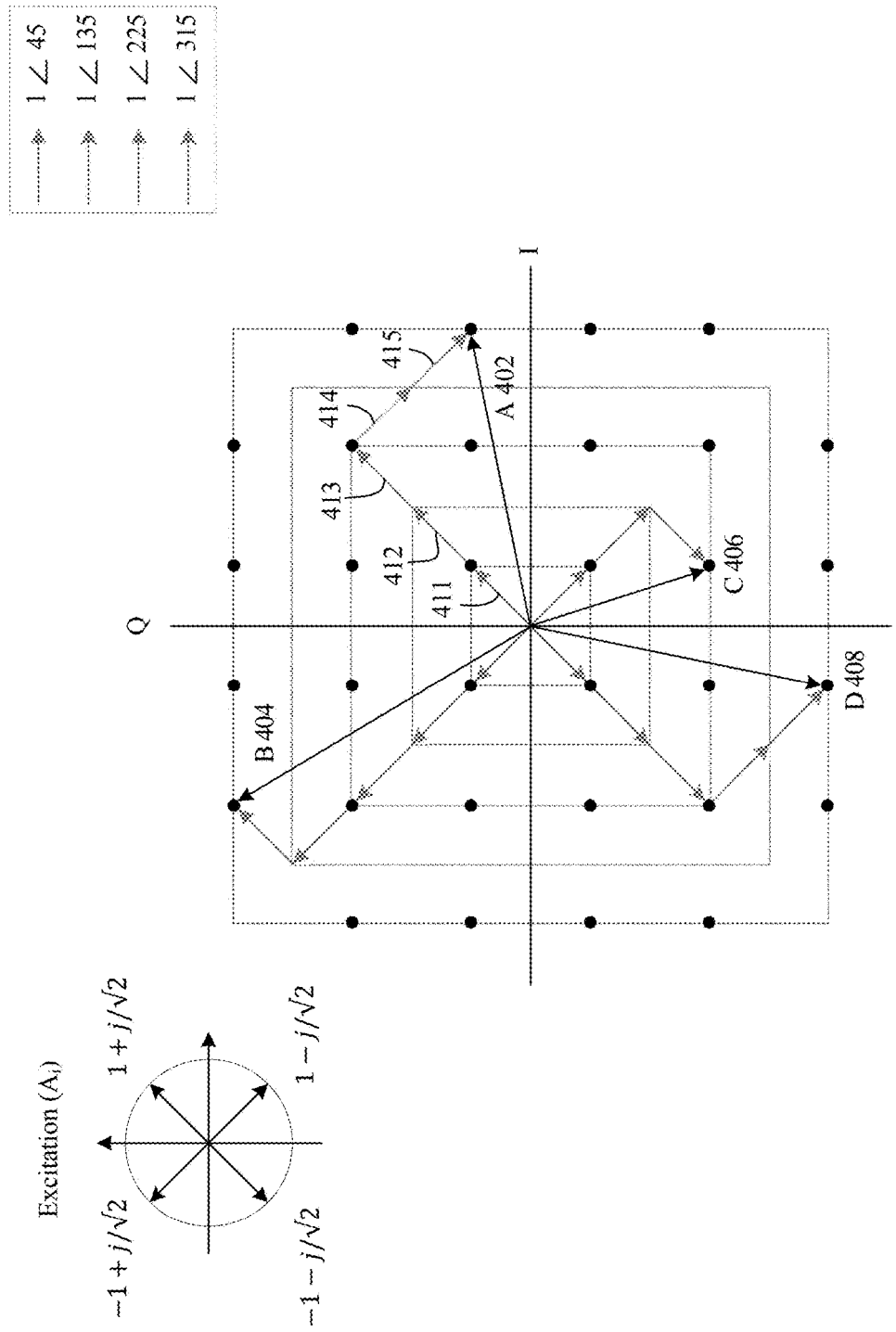
FIG. 4 illustrates generation of QAM32 constellation symbols, according to an embodiment.

To illustrate the process of selectively activating the equivalent transmitter units for generating a desired modulated output signal, a 32-QAM may be used. FIG. 4 illustrates generation of QAM32 constellation symbols, according to an embodiment. Symbols A, B, C and D are shown in a 32-QAM constellation diagram, according to an embodiment. To generate symbol A 402, using a transmitter array having a topology 300, three transmitter units 411, 412, and 413 with phase 45 degrees, and two transmitter units 414 and 415 with phase 315 degrees may be selectively activated. Based on array factor, the overall signal in the far field would get amplitude and phase according to symbol A. The same approach may be used to determine the number of transmitters and their respective phases to be selectively activated to obtain any symbol on the constellation diagram, including symbols B 404, C 406, and D 408 as shown.

TABLE 1 illustrates the minimum number of transmitter units required for each QAM order. To calculate the minimum number of transmitters (N) required for a given QAM order (denoted as $2^M$, where M is an integer), the formula is expressed as: $N_M = 2N_{M-2} + 1$. Here, $N_M$ represents the number of transmitters required for a QAM of order $2^M$. According to the formula, the number of transmitters needed for a given QAM order is twice the number of transmitters required for a QAM order two levels down (i.e., M-2), plus one. The starting points for calculations depend on whether M (the exponent in the QAM order) is even or odd. For M being even (e.g., QAM16, QAM64), the base case is $N_2=1$. This means that for QAM4 (which is $2^2$), only 1 transmitter unit is required. For M being odd (e.g., QAM32, QAM128), the base case is $N_5=5$. This implies that for QAM32 (which is $2^5$), 5 transmitter units are required. Using this formula and the base cases, one can recursively calculate the number of transmitters needed for higher-order QAMs. For example, to find out the minimum number of transmitters unit required for QAM64 ($2^6$), the value for QAM16 ($2^4$) is used and the formula is applied. This formula provides a systematic way to determine the minimum number of transmitters as the QAM order increases, reflecting the increasing capacity of the transmitter array with higher-order QAM.

TABLE 1

| QAM4 | QAM16 | QAM32 | QAM64 | QAM128 | QAM256 | QAM512 | QAM1024 |
|---|---|---|---|---|---|---|---|
| 1 | 3 | 5 | 7 | 11 | 15 | 23 | 31 |

To limit or tolerate errors, the positioning of the selectively activated transmitter units may need to be considered to minimize phase variation. To generate the desired modulated output signal, the selection of equivalent transmitter units from the plurality of equivalent transmitter units of a transmitter array may be based on the locations in the array. For every symbol of any QAM order, one or two different phases in the selected activated transmitter units may get excited as shown for example in FIG. 4. For symbols that fall on the diagonal of the QAM constellation (i.e., those with coordinates (+−m, +−m) or (−m, −m), where 'm' is a natural number), one phase is excited. For non-diagonal symbols, those with coordinates (+−n, +−m), 'n' and 'm' are different natural numbers (n'=m), transmitter units with two different phases need to be activated to generate the symbol. These non-diagonal symbols require distinct amplitude changes in both the sine and cosine waves, leading to the excitation of two different phases. To obtain a reliable output signal, minimizing side lobes and maximizing phase flatness over the broadside may be desirable. Accordingly, in some embodiments, after determining the number of transmitter units and their phases, the transmitter units are selectively activated based on their location in the array to minimize side lobes and maximize phase flatness over the broadside. Thus, broadside radiation, acceptable side lobe level and phase flatness may be achieved for all symbols. In some embodiments, maintaining symmetry may be an adequate approach in locating transmitter unit of each phase.

In some embodiments, depending on the array size, a compact of sparse array solution can be utilized. In a sparse array design, active transmitter unit locations and their phases (between predetermined values for that symbol) may be subjected for optimization. The positions (locations) of the active transmitter units with predetermined phases in the transmitter array can be adjusted or fine-tuned within the available locations within the array order to optimize or improve the transmitter arrays' performance (e.g., gain, side lobe, beam forming, phase consistency and accuracy). Since the position of the active transmitter units within the array effects the beam forming and phase consistency in the intended transmission direction, hence, by optimizing their location, intended operational parameters (e.g., phase consistency angle, side lobe level, array gain) can be optimized.

Figure 5:
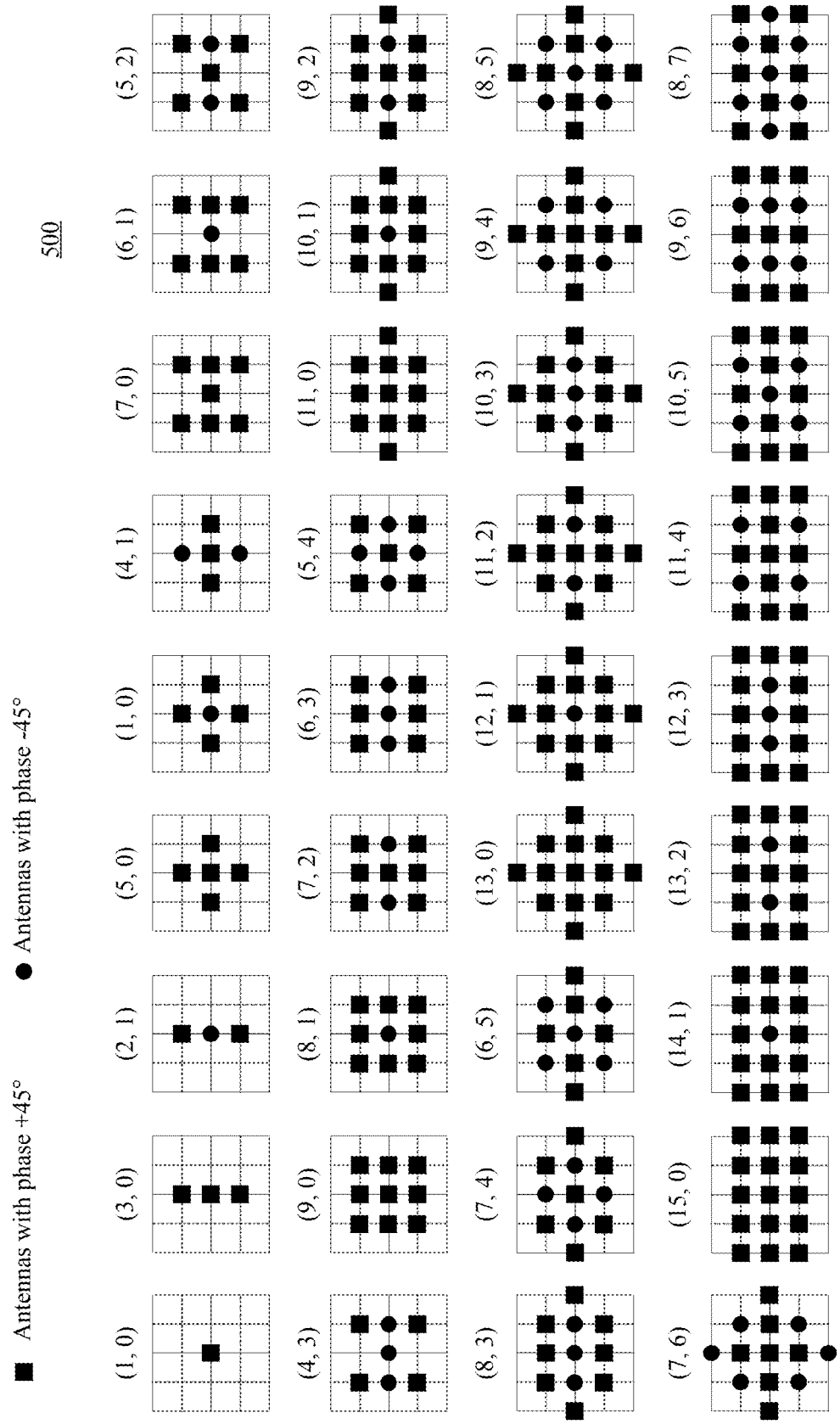
FIG. 5 illustrates suggested antenna arrangements, according to an embodiment.

FIG. 5 illustrates suggested antenna arrangements, according to an embodiment. The suggested antenna arrangements 500 indicate suggested distribution of antenna locations of QAM modulations up to 256-QAM. The suggested antenna arrangements 500 may apply for compact and minimum size array realization, according to an embodiment. In FIG. 5, only symbols generated by 45° and 315° (−45° are provided. Each suggested antenna arrangement in FIG. 5 indicates a number of antennas with phase +45° and a number of antennas with phase −45° as illustrated. Due to symmetry, the rest of the symbols may be reproducible by replacing phases by their respective values.

The potential arrangements of active antennas are no limited to the suggested antenna arrangements 500. Other potential arrangements, including asymmetrical arrangements, may be chosen or selectively activated based on the intended application.

Based on physics of spatial power combination and wave interactions of multiple transmitter units, and following beamforming theory, ideal phase and amplitude combination is expected to take place at the broadside and gradually fade in accuracy by deviating from the broadside. From a practical point of view, accuracy is expected to be kept to about half-power beam width of the beam formed signal where the most part of the transmitted power resides.

Figure 6A:
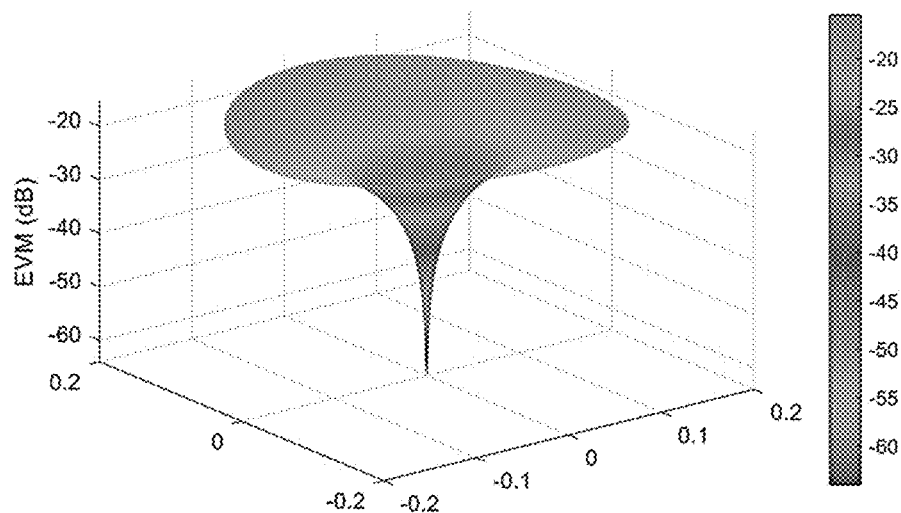
FIG. 6A illustrates EVM value of QAM 256 for all theta and phi values, according to an embodiment.
Figure 6B:
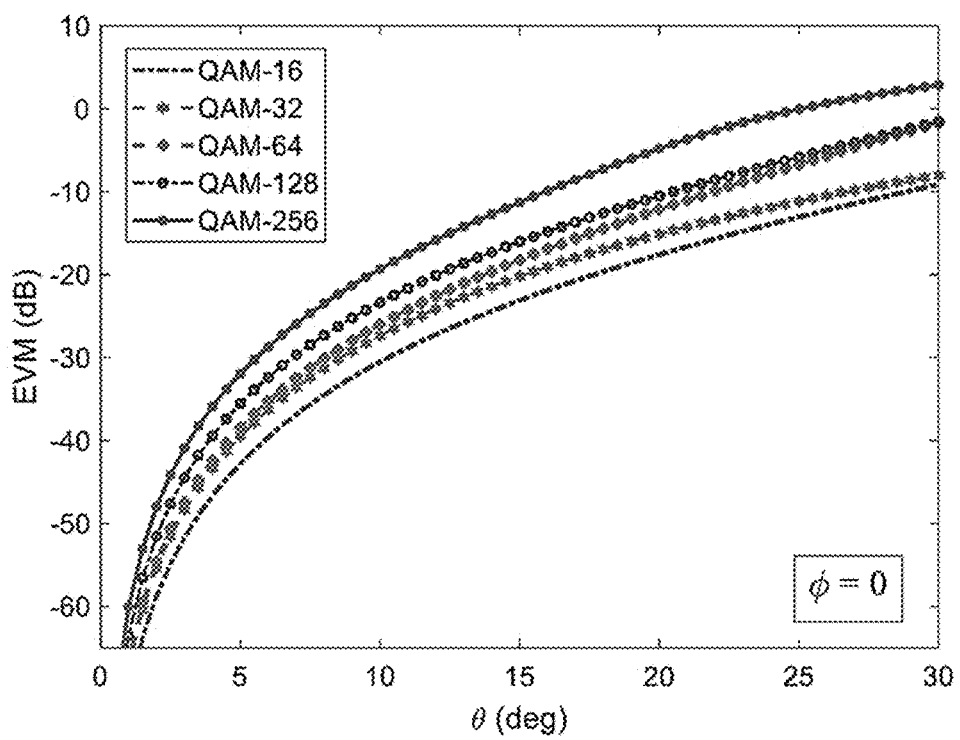
FIG. 6B illustrates EVM variation for different QAM orders, according to an embodiment.

To quantitively study the range of validity (e.g., validation angle range) in which the transmitted constellation can be retrieved, error vector magnitude (EVM) parameter may be used as the reference. Applying formula (2) array factor for the array positioned according to FIG. 5, based on Friis formula and array factor, waveform for every angle may be calculated, and the constellation re-constructed. FIG. 6A illustrates EVM value of QAM 256 for all theta (elevation) and phi (azimuth) values, according to an embodiment. As shown in FIG. 6A, at broadside, the EVM is negligible and increases by elevation angle deviation over all azimuth angles. The axes of the bottom plane represent projections of azimuth ($\phi$) and elevation ($\theta$) angles onto the x and y axes. The x-axis is defined by x=sin ($\theta$) cos ($\phi$) and the y-axis by y=sin ($\theta$) sin ($\phi$), with theta ranging from 0 to 180 degrees to capture the elevation from the horizon to the zenith, and phi ranging from 0 to 360 degrees to encompass the full horizontal rotation. FIG. 6B illustrates EVM variation for different QAM orders, according to an embodiment. In FIG. 6B, a quantitative comparison is shown between various orders of QAM modulation. As shown, by increasing modulation order, the EVM drops faster by angle deviation. For commercial communication applications, an approximate −20 dB to −30 dB transmit EVM may be required. This, in turn, provides approximately 20 degrees of freedom to position the receiver. The EVM condition may vary based on data rate and modulation order, and the provided range may serve as a close approximation for reference.

Accordingly, one or more aspects may provide for improved security based on the validation angle range. An unintended listener, while may receive the transmitter power, may be unable to reconstruct the data and the constellation based on spatial power combination concept, since the transmitted constellation is only retrievable at the intended direction of transmission. Thus, a physical layer security may be enabled according to one or more embodiments, which may obviate the need or reliance on coding-based or processing-based security.

In some embodiments, depending on the application of a transmitter array, a corresponding antenna arrangement may be selected. For example, the validation angle may be narrowed by having, potentially, an asymmetrical antenna arrangement activated. The arrangement of the active antennas may be selected based on the intended angle for ideal construction. The arrangement of the active antennas may determine the level of degradation based on the extent of deviation from the intended angle. As such, security may be improved based on controlling the validation angle range and the arrangement of active antennas.

Based on antenna theory, antenna radiation pattern may vary based on changes in boundary conditions. In a small array of antennas, those antennas positioned at the sides of the array experience different boundary condition compared to the antennas in the middle. This discrepancy in boundary conditions makes the side antennas more susceptible to variations in gain.

Figure 7A:
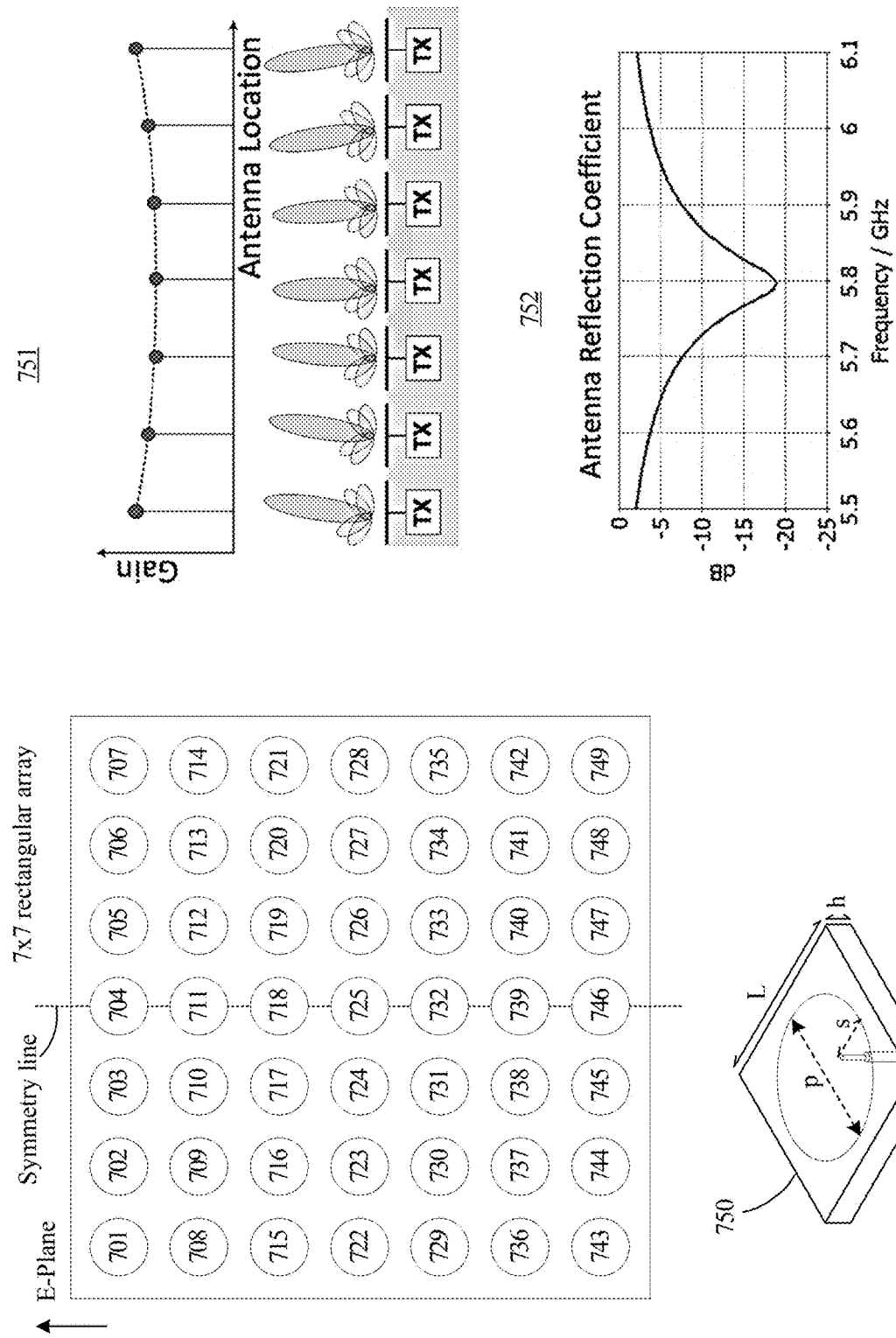
FIG. 7A illustrates a 7×7 array of antennas, according to an embodiment.

While it may be assumed that all transmitter units have equivalent or identical power levels and gain values, the different boundary conditions may be relevant, and their effects may be considered. In this regard, the antenna array 700 of FIG. 7A is considered. FIG. 7A illustrates a 7×7 array of antennas, according to an embodiment. The antenna array 700 may comprise a 7×7 array of circular patch antennas, shown as 701 to 749, on a 30mils RO4003 substrate 750 to generate a typical array implementation. No coupling cancellation method is used. The antenna gain as a function of antenna location in the array is shown in graph 751. As shown, the antennas positioned in the middle of the array 700 may contribute more to the main lobes compared to antennas positioned at the edge of the array. Illustration 751 represents the general behavior of antennas in an array. Centre located antennas face much less deviation and have less gain compared to edge located antennas. This pattern is one reason why some antenna arrays use what are called 'dummy' or 'guard' antennas. These are edge antennas of the array which are not used for sending or receiving the main signals. Instead, they help make the performance of the central antennas more consistent. By surrounding the central, actively transmitting antennas with these guard antennas, the whole array can operate more evenly, so the signal is strong and clear in the desired direction. The figure, while showing a 7-element array, is just an example. The concept applies to arrays with different numbers of antennas. Further, graph 752 illustrates how antenna reflection coefficient in dB of the array 700 may vary with frequency in gigahertz (GHz). The reflection coefficient indicates how effectively an antenna is matched to its transmission line, which is relevant for the antenna's proper operation. A lower reflection coefficient, indicated by more negative decibel (dB) values, suggests that the antenna is well-matched, allowing most of the transmitted signal to radiate outward rather than being reflected back towards the source. As observed in the graph 752, there is a notable dip at approximately 5.8 GHz, signifying an optimal match at this frequency (for the array 700) where the reflection coefficient reaches its minimum. The graph 752 serves to affirm the matching quality of the antennas within the array, which is applicable for their effective functioning.

Due to array symmetry, the radiation pattern of selected sets of antennas in the array 700 are extracted from a full wave simulation and provided in FIG. 7B. The antennas on the other side of the symmetry line are expected to behave similarly. FIG. 7B illustrates radiation pattern of select antennas of the array of FIG. 7A, according to an embodiment. As shown, antennas in the middle show the highest gain consistency and the gain consistency drops by moving towards the edge antennas. Radiation pattern 760 correspond to antennas 701, 702, 703, and 704, and radiation pattern 766 correspond to antennas 701, 708, 715 and 722. As shown, due to their proximity to the edge, the antennas on the side (edge or side antennas) exhibit radiation patterns with asymmetries or variations in gain in certain directions.

Radiation pattern 762 correspond to antennas in the middle of the array (middle antennas), e.g., antennas 717,

718, 724, 725, 731 and 732. As shown, the middle antennas exhibit a more uniform radiation pattern and contribute to the formation of the main lobes as shown in graph 751. Further radiation pattern 764 correspond to intermediate antennas, positioned between the side antennas and the middle antennas, e.g., antennas 709, 710, 711, 712, 723 and 730. As shown, radiation pattern 764 of the intermediate antennas are less influenced by edge effects compared to side antennas and thus allow for a more uniform radiation pattern compared to side antennas. The intermediate antennas may further contribute to the formation of main lobes aligned with the array axes as shown in graph 751. Accordingly, in some embodiments, edge antennas may be used as guard (e.g. dummy) antennas and middle antennas may be selectively activated within the transmitter topology.

Figure 8:
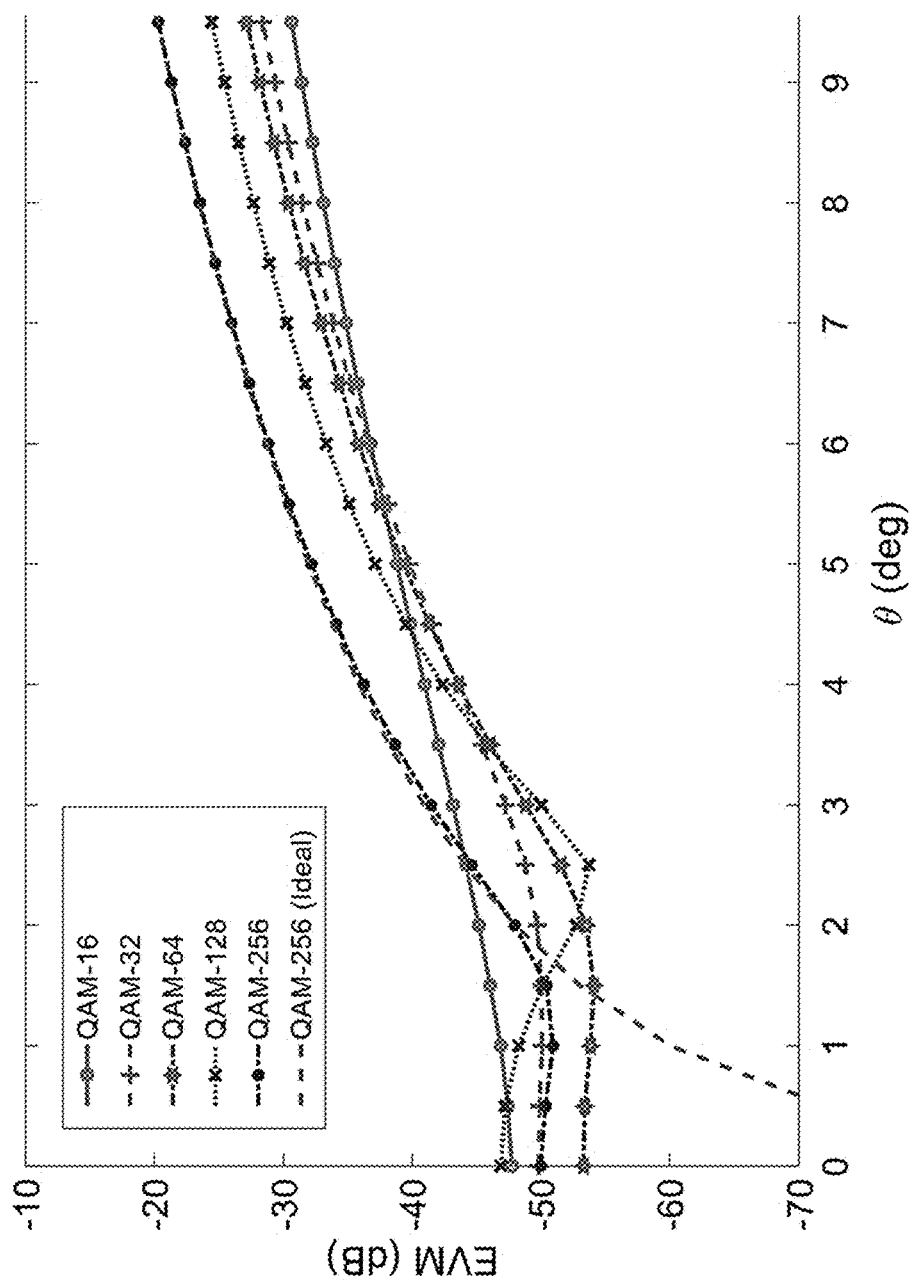
FIG. 8 illustrates EVM degradation based on antenna gain variation, according to an embodiment.

In an embodiment, importing the antenna gains (radiation patterns) of the array 700 into the signal formation formulas (array factor formula), the transmitter EVM of the array 700 with the suggested antenna positioning of FIG. 5 are calculated. The resulting transmitter EVM values are illustrated in FIG. 8. FIG. 8 illustrates EVM degradation based on antenna gain variation, according to an embodiment. Graph 800 shows the effect of antenna gain variation in EVM. Comparing FIG. 8 with the curves in FIG. 6B, one can observe that gain variation mostly degrades the ideal EVM behaviour at the broadside. However, this modification results in a limited value. Notably, this deviation may have negligible effects on the transmitters' performance in practical scenarios, as the observed values remain well below the minimum acceptable thresholds. It is worth noting that the decline in EVM at higher angles may be mainly governed by the spatial power combination mechanism, mirroring the anticipated ideal scenario. As a result, the effects of antenna gain may be readily controlled and effectively managed.

Accordingly, in large array realization, antenna gain variation may cease to be a major concern. The improved flexibility in antenna locations, according to one or more embodiments, may allow for optimizing or improving various aspects of the performance.

According to an aspect, a structure (e.g., topology 300) may be provided for practical implementation of large arrays with active transmit units for mmW and THz band applications. One or more aspects may address power distribution issues over large arrays by being compatible with various types of power generation and distribution, based on array size and application.

One or more aspects may allow for improved power efficiency in transmitter operation by removing DACs from transmit chain and minimizing the back off power requirement from PAs, thereby allowing them to operate close to their optimum efficiency and power levels.

One or more aspects may allow for a more robust implementation of a transmitter array. In contrast to the SoA, according to one or more embodiments, all transmitter units in the transmitter array may be equivalent or identical which may reduce the risk of fabrication-based errors. This feature may be valuable in mmW and THz application where symmetry preservation is cumbersome.

According to one or more embodiments, the topology 300 may be versatile and open or amenable to optimization within a sparse array configuration, offering opportunities to enhance various aspects based on applications.

Figure 9:
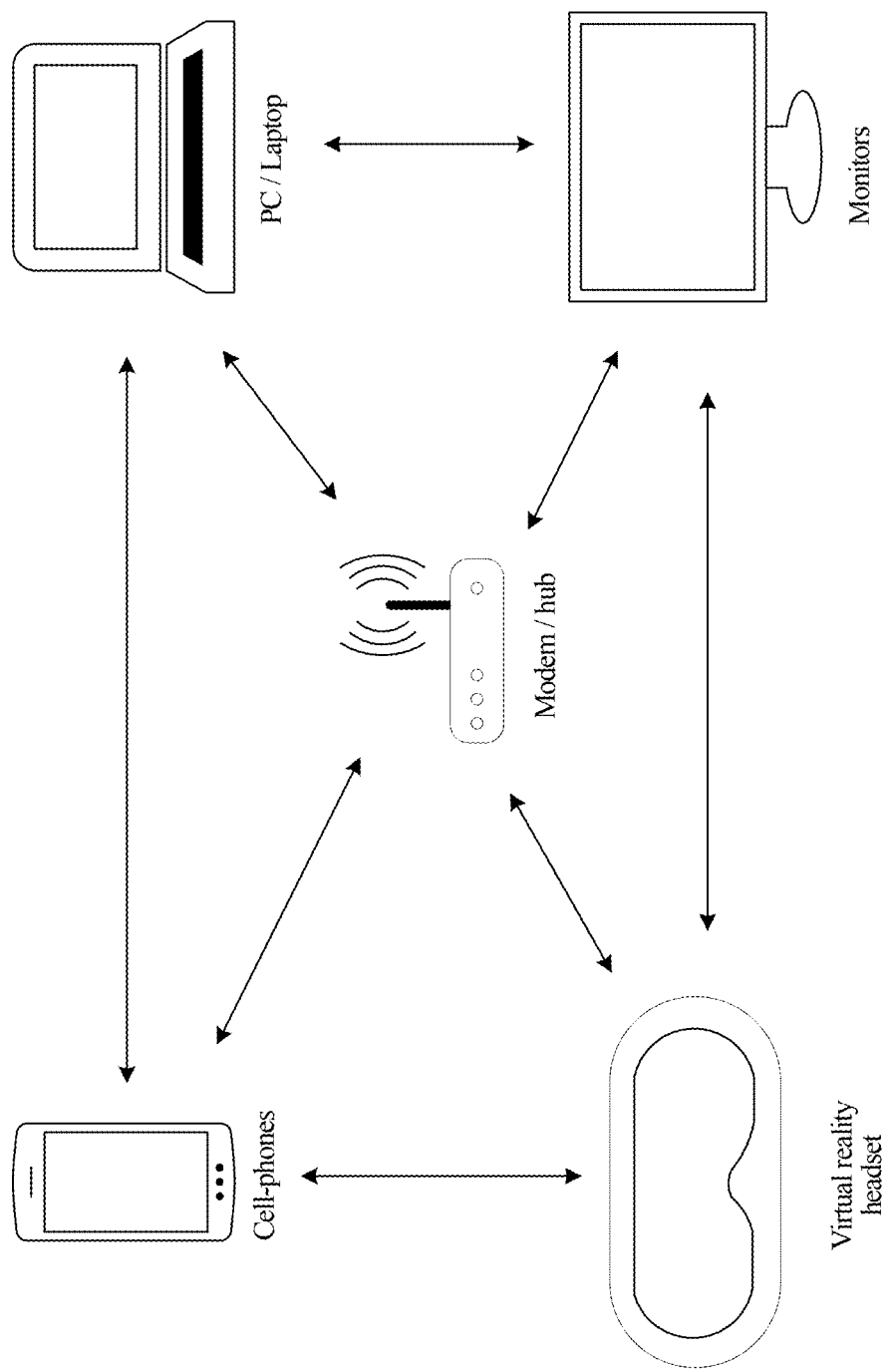
FIG. 9 illustrates examples of short-range, high data rate wireless communications, according to an embodiment.

FIG. 9 illustrates examples of short-range, high data rate wireless communications, according to an embodiment. In modern gadgets, as shown in FIG. 9, a substantial amount of data is gathered, and local processing may consume unrealistic amounts of energy, leading to battery depletion or an increase in the cost of the particular device. Alternatively, sending data to a processing unit and receiving the results back may be an option to deal with power consumption issues. To mitigate some performance issues, such as delays, having a high-capacity wireless connection may become crucial, as it may impose less power consumption compared to local processing. This trend has become increasingly important in SoA devices to reduce weight and cost and improve battery life and ease of use. One or more aspects of the disclosure may play a central role in this path.

One or more aspects may provide advantages in mmW and THz short range communication systems, including high data rate communication, involving beamforming and requiring low power consumption. Examples of devices that may be applicable include handheld gadgets such as cell phones, smart watches, cameras, and virtual reality headsets.

Due to substantial power consumption at mmW and THz frequencies, one or more aspects may provide advantages to wired devices with no generality requirements. For instance, the tendency or the growing trend to remove cable-based data transfer in short-range settings (e.g., homes and offices) represents a significant potential market. Notable instances include the wireless connection between PCs (laptops) and monitors, hubs, and TVs, among others.

One or more aspects may further apply to potential use cases in applications where channel complexity is relatively low, and challenges such as fading, multi-pathing, and interferences can be effectively managed without resorting to advanced waveforms like OFDM. One or more aspects may further provide for high data rate capabilities without the need for excessive hardware complexities associated with general-purpose devices.

Figure 10:
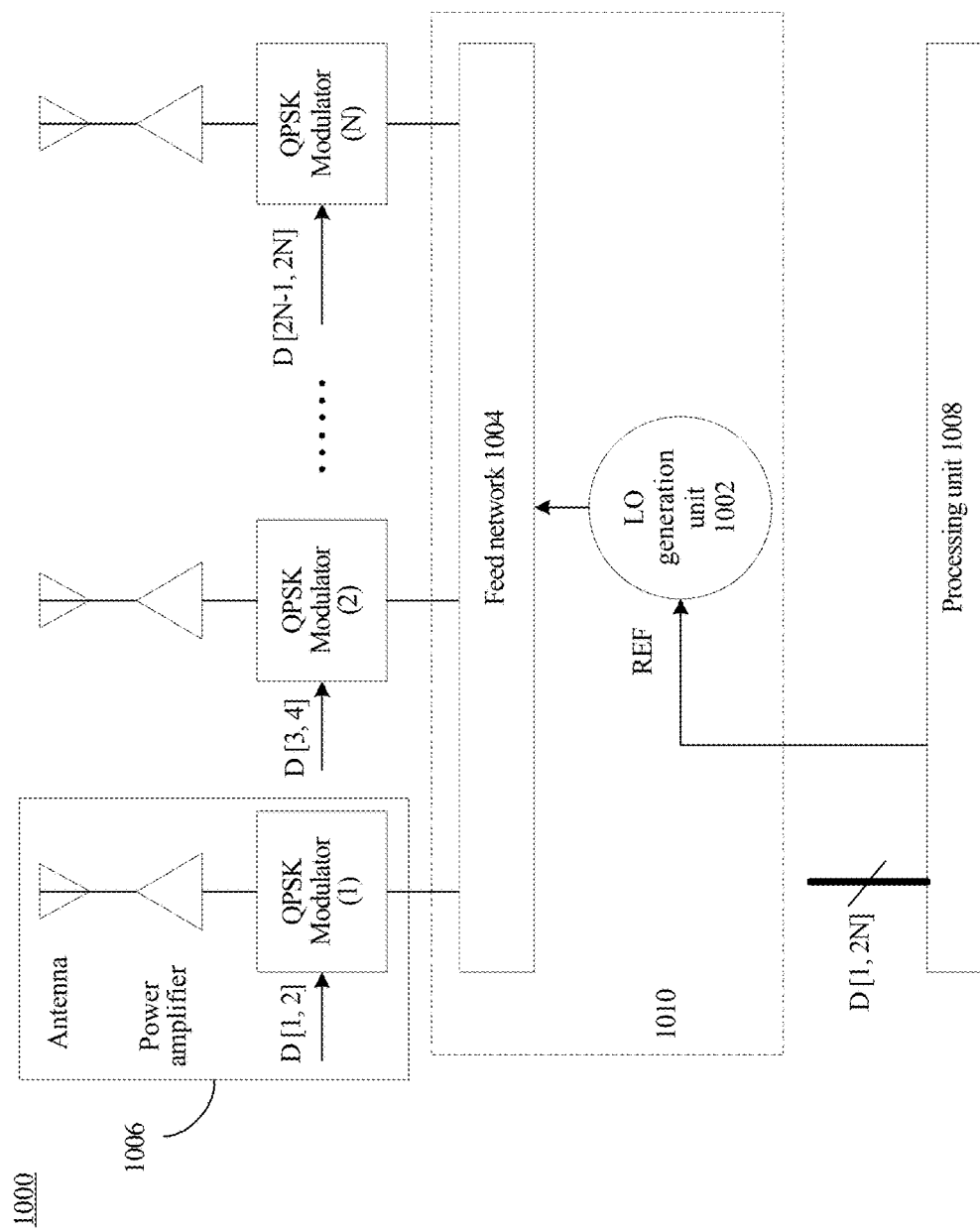
FIG. 10 illustrates a topology of a transmitter array with a central power generation unit and a feed network distribution, according to an embodiment.

FIG. 10 illustrates a topology of a transmitter array with a central power generation unit and a feed network distribution, according to an embodiment. Topology 1000 may apply to small and compact array size implementations. Topology 1000 may be similar to topology 300 as they relate to each equivalent transmitter unit and selective activation of a set of equivalent transmitter units to generate a desired modulated output signal. In some embodiments, for small array sizes, one power generation unit 1002 following a feed network 1004 may be an example configuration that offers manageable complexity. A one-dimensional representation is illustrated for clarity, and the same concept may apply for both 1D and 2D array implementations.

As illustrated, a transmitter array based on topology 1000 may comprise a plurality of equivalent transmitter units, similar to topology 300. Each equivalent transmitter unit 1006 may include one or more of: a QPSK modulator, a PA, and an antenna. In some embodiments, the PA is optional. Based on the application, the necessity of the PA may vary. For instance, at high-mmW and THz frequencies, achieving efficient signal amplification may be challenging. In such frequency ranges, with current technologies, efficiency in amplifying signals may not be possible. As a result, the PA stage may be removed. As further illustrated, each modulator may receive two digital data bits from a processor unit 1008 to determine the modulator's activation state and phase value. The phase value being one of 45, 135, 225, 315 degrees. One or more transmitter units that are not used (not selectively activated) do not require any data input. Their inputs can be effectively turned off. This can be done by setting their register pins to a high impedance state. Alternatively, another method can be used to turn the inputs on or off as needed.

In topology 1000, the LO power generation unit 1002 may generate an LO signal, which is then sent through the feed network 1004 as an LO signal to each equivalent transmitter unit of the plurality of equivalent transmitter units. The LO signal power generation and distribution mechanism 1010 (involving the LO generation unit 1002 and feed network 1004) of topology 1000 may be similar to the LO signal power generation and distribution mechanism 324 of topology 300.

In some embodiments, a set of equivalent transmitter units of the plurality of transmitter units may be used to generate a high order of QAM. This involves increasing the number of points in the QAM constellation, allowing for the transmission of more bits per symbol. The formation of the constellation may be achieved through spatial power combination, where the power contributions of the set of distributed equivalent transmitter units are combined. This approach leverages spatial diversity or spatial multiplexing to enhance the overall performance of the communication system. According to an embodiment, due to activation of different number of equivalent transmitter units for every symbol, the array factor may change accordingly. The array factor is a representation of the waveform and radiation pattern, the input is TX units' locations across the array. The array factor may serve as the source of waveform generation and thus may shape or form the waveform.

The principle of operation of topology 1000 may be similar to the principle of operation of topology 300, 1100 and 1200, where the principle of operation includes that each equivalent transmitter unit of a transmitter array may be selectively activatable or independently controllable and a set of equivalent transmitter units of the transmitter array may be selectively activated to generate a desired modulated output signal, as described herein.

Figure 11:
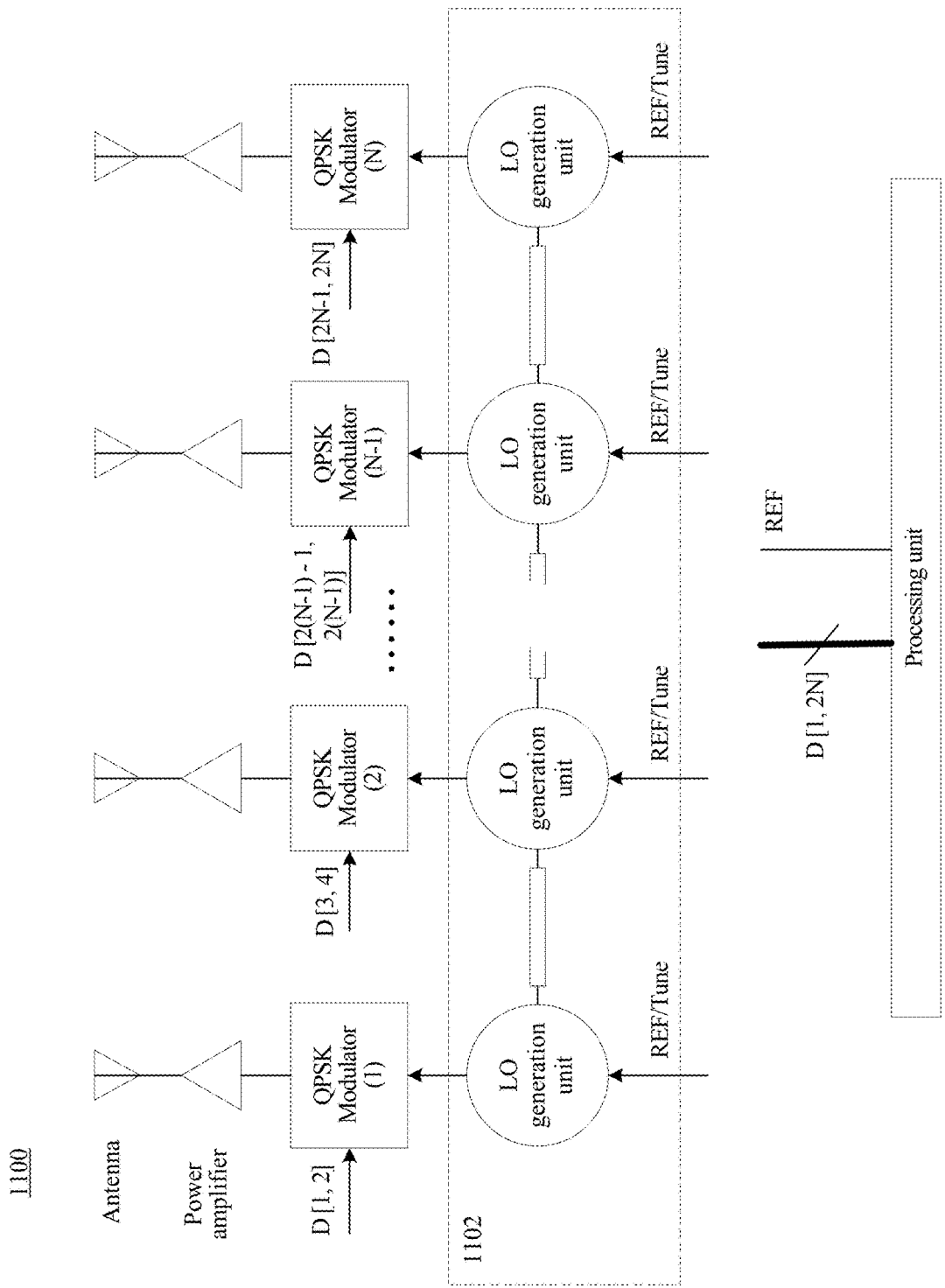
FIG. 11 illustrates another topology of a transmitter array, according to an embodiment.

FIG. 11 illustrates another topology of a transmitter array, according to an embodiment. Topology 1100 may apply to large array implementations. Topology 1100 may be similar to topology 1000 and 300 as they relate to each equivalent transmitter unit and selective activation of a set of equivalent transmitter units to generate a desired modulated output signal. In topology 1100, the LO signal power generation and distribution mechanism 1102 (involving an LO generation unit for each equivalent transmitter unit) of topology 1100 may be similar to the LO signal power generation and distribution mechanism 320 of topology 300.

In topology 1100, each equivalent transmitter unit may include a power generation unit, which removes the need for the feed network of topology 1000. The plurality of LO power generation units (i.e., the LO signal generation configuration 1102) of topology 1100 may be implemented in various ways. In some embodiments, the plurality of LO power generation units may (i.e., the LO signal generation configuration 1102 may) form a complete frequency synthesizer unit. This frequency synthesizer unit may comprise components such as a voltage controlled oscillator (VCO) and phase-locked loop (PLL) units (e.g., a separate VCO and a PLL unit for each transmitter unit). The plurality of LO power generation units may be synchronized in terms of phase by connecting them to a shared reference (REF) signal. In this embodiment, the phase/frequency synchronization is provide through reference signals.

In some embodiments, the plurality of LO power generation units may (i.e., the LO signal generation configuration 1102 may) form a coupled oscillator array (COA) configuration, where VCOs are connected to each other through passive or active circuitries to achieve injection locking. In this configuration, a shared PLL unit may be used and a unique VCO exist for each transmitter unit. The shared PPL may ensure synchronization among the VCOs by comparing their output phases with a common reference signal. The outcome of the shared PLL unit, the DC tune, may be fed back to the VCOs, setting their phase and frequency across the array.

Apart from LO signal power generation and distribution mechanism 1102, the principle of operation of topology 1100 may be similar to the principle of operation of topology 1000, 300 and 1200, where the principle of operation includes that each equivalent transmitter unit of the transmitter array may be selectively activatable or independently controllable and a set of equivalent transmitter units may be selectively activated to generate a desired modulated output signal, as described herein.

Figure 12:
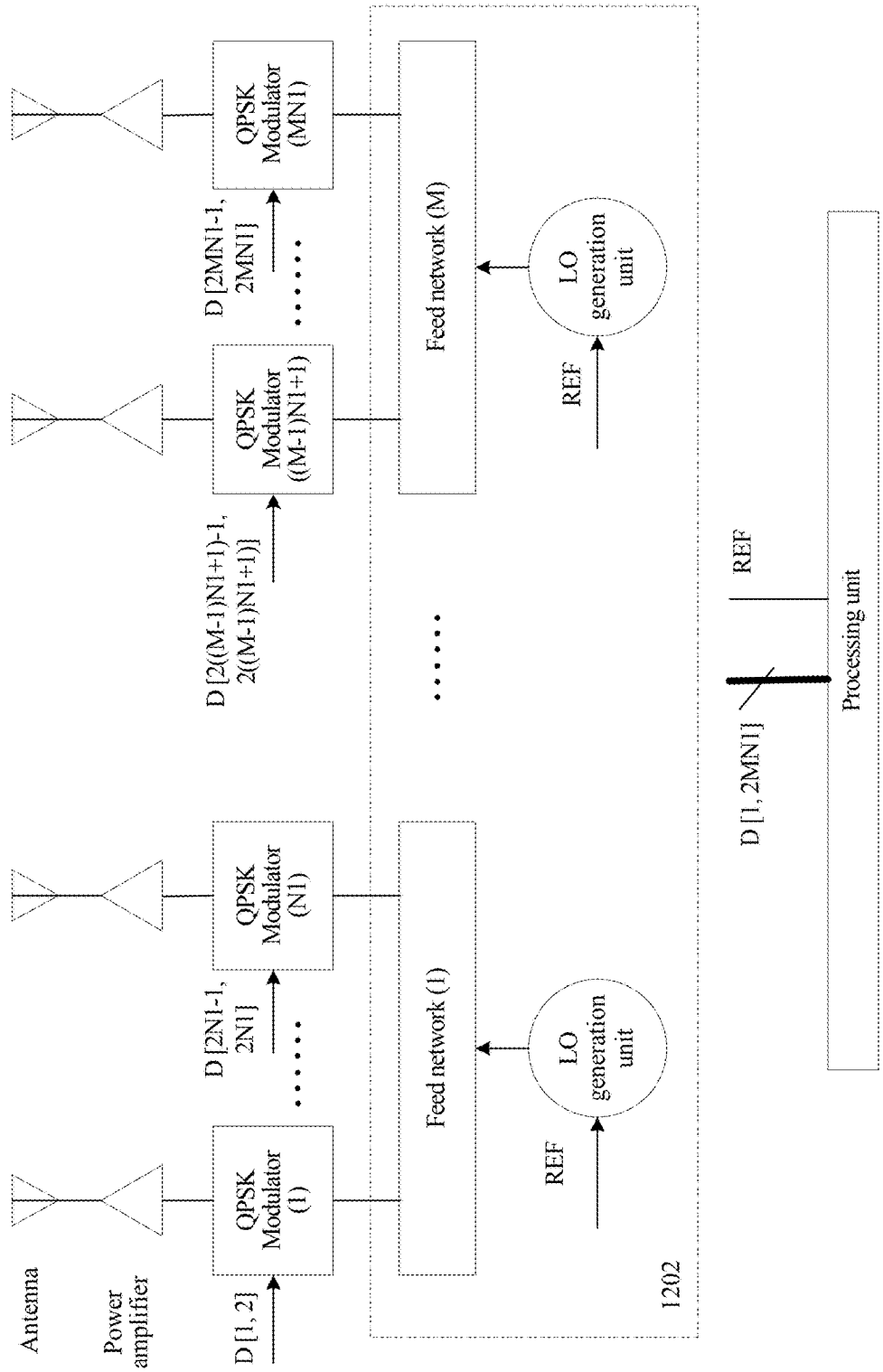
FIG. 12 illustrates another topology of a transmitter array, according to an embodiment.

FIG. 12 illustrates another topology of a transmitter array, according to an embodiment. Topology 1200 illustrates an alternative LO signal power generation and distribution mechanism 1202. In some embodiments, the LO signal power generation and distribution mechanism 1202 may be used for a multi-channel multi-functional transmitter. Topology 1200 may be similar to topology 1100, 1000 and 300 as they relate to each equivalent transmitter unit and selective activation of a set of equivalent transmitter units to generate a desired modulated output signal. The LO signal power generation and distribution mechanism 1202 may be similar to the LO signal power generation and distribution mechanism 322 of topology 300.

The LO signal power generation and distribution mechanism 1202 may be based on a combination of the LO signal power generation and distribution mechanisms 1010 and 1102, comprising a combination of multiple signal power sources (e.g., LO power generation units) and multiple feed networks. The size of the feed networks in LO signal power generation and distribution mechanism 1202 may vary. The size of a feed network may depend on the number of equivalent transmitter units to which the feed network provides LO signals. In some embodiments, smaller feed network(s), in order of 1-to-4 and 1-to-16 may provide practical routing simplicity and low transmission loss.

In some embodiments, a transmitter array configured according to topology 1200 or 300 may include a plurality of equivalent transmitter units organized into a plurality of groups of equivalent transmitter units. Each group of equivalent transmitter units may include one or more equivalent transmitter units and correspond to a power generation unit. Each group of equivalent transmitter units may receive an LO signal at each equivalent transmitter unit according to the LO signal power generation and distribution mechanism 1010 or 1102.

In some embodiments, the hybrid network 1202 can switch one or more groups of equivalent transmitter units between isolated operations, where a group of equivalent transmitter units may transmit signals on an independent channel, or multiple groups of equivalent transmitter units may transmit signals collectively on a shared channel. Accordingly, in some embodiments, the plurality of groups of equivalent transmitter units may operate in different modes. In a first mode of isolate operation, a group of equivalent transmitter unit may operate independently on its own channel transmitting signals on a dedicated and separate channel without coordination with other groups. In a second mode, multiple groups of equivalent transmitter units can combine or joint together to transmit signals on a single channel. In the second mode, one or more equivalent transmitter units from different groups of equivalent transmitter units may synchronize and collaborate to transmit signals collectively on a shared channel.

Apart from LO signal power generation and distribution mechanism 1202 and added flexibility, the principle of operation of topology 1200 may be similar to the principle of operation of topology 1000, 300 and 1100, where the principle of operation includes that each equivalent transmitter unit of a transmitter array may be selectively activatable or independently controllable and a set of equivalent transmitter units of the transmitter array may be selectively activated to generate a desired modulated output signal, as described herein.

One or more aspects may provide for various topologies of a transmitter array comprising a plurality of equivalent or identical transmitter units (based on QPSK modulators). One or more aspects, including the various topologies, may provide for improved transmitter performance and robustness to re-configurability and fabrication error. The selective activation of one or more equivalent transmitter units may allow for ease of re-configurability. The equivalent or identical aspects of the transmitter units in a transmitter array may allow for preservation or ease of obtaining symmetry. Symmetry may further allow for scalability and reduced susceptibility to fabrication error.

One or more aspects may provide compatibility for distributed array topologies. Some embodiments may provide for one or more of: large array realization and feed network elimination. One or more aspects may further provide for a direct connection between an equivalent QPSK transmitter unit to a corresponding antenna, thereby allowing for versatility on location optimization for beamforming and improved budget link management.

According to an aspect, the operation of a transmitter, based on one or topologies, may be optimized based on one or more operational parameters. For example, the range or accuracy of the validation angle may be improved based on selecting an arrangement of antennas to widen or narrow the validation angle. Further, arrangement of the antennas can be selected based on a specific beamforming or data rate.

One or more aspects may provide for a dynamic transmitter. Since each equivalent transmitter unit in the transmitter array is selectively activatable (independently controlled), the transmitter array may dynamically select and activate a set of equivalent transmitter units depending on the type of signal to be transmitted.

In the described topologies herein, while a one-to-one ratio of antenna to modulator for each equivalent transmitter is used herein, a different antenna to transmitter (modulator) ratio may be used. For example, a one antenna per three transmitters (modulators) ratio may be used for each equivalent transmitter unit to obtain QAM16, or a one antenna to seven transmitters (modulators) ratio may be used to obtain QAM64.

One or more aspects, including one or more topologies described herein, may be used in combination or conjunction with another transmitter topology. The one or more topologies described herein may be based on or optimized for high data rate, power-efficient mmW systems. The one or more topologies may further be improved via a complementary topology or additional circuitry to provide for a more general applicability and advanced features such as fading, multi-path compensation, and so on. Accordingly, one or more topologies described herein may be used, in addition to serving as independent transmitter(s), as a gear within or a component contributing to a larger system.

In the context of one or more embodiments described herein, the term 'QPSK modulator' encompasses any variant of QPSK modulation that encodes two bits per symbol. This includes, but is not limited to, DQPSK (Differential QPSK), π/4 QPSK, OQPSK (Offset QPSK), and Shaped OQPSK.

FIG. 13 illustrates a method of generating a desired modulated output signal, according to an embodiment. The method 1300 includes receiving 1301 a plurality of local oscillator (LO) signals at a transmitter array. The transmitter array may be based on one or more topologies 300, 1000, 1100 or 1200. The transmitter array may include a plurality of equivalent transmitter units. Each equivalent transmitter unit may be selectively activatable and include an antenna and a quadrature phase shift keying (QPSK) modulator. The method 1300 further includes selectively activating 1302 a set of equivalent transmitter units of the plurality of equivalent transmitter units to generate the desired modulated output signal.

In some embodiments, selectively activating the set of equivalent transmitter units of the plurality of equivalent transmitter units to generate the desired modulated output signal includes generating a set of modulated output signals by selectively activating each equivalent transmitter unit of the set of equivalent transmitter units to generate a corresponding modulated output signal of the set of modulated output signals. In some embodiments, selectively activating the set of equivalent transmitter units of the plurality of equivalent transmitter units to generate the desired modulated output signal further includes combining the set of modulated output signals to generate the desired modulated output signal.

In some embodiments, the plurality of LO signals are received from one or more power generation units.

In some embodiments, the plurality of equivalent transmitter units are organized into one or more groups of equivalent transmitter units. Each group of equivalent transmitter units may include one or more equivalent transmitter units and correspond to a power generation unit of the one or more power generation units. In some embodiments, receiving the plurality of LO signals at the transmitter array includes receiving, at each equivalent transmitter unit of each group of equivalent transmitter units, an LO signal of the plurality of LO signals from the power generation unit corresponding to said each group of equivalent transmitter units.

In some embodiments, each equivalent transmitter unit of the plurality of equivalent transmitter units further includes a power generation unit. In some embodiments, receiving the plurality of LO signals at the transmitter array includes receiving, at each equivalent transmitter unit of the plurality of equivalent transmitter units, an LO signal from the corresponding power generation unit.

In some embodiments, each equivalent transmitter unit of the plurality of equivalent transmitter units further includes a power amplifier for amplifying an output of the corresponding QPSK modulator.

In some embodiments, selectively activating each equivalent transmitter unit of the set of equivalent transmitter units to generate a corresponding modulated output signal of the set of modulated output signals includes receiving, at a corresponding modulator of said each equivalent transmitter unit, digital data bits for modulating an LO signal of the plurality of LO signals to selectively activate said each equivalent transmitter unit. In some embodiments, selectively activating each equivalent transmitter unit of the set of equivalent transmitter units to generate a corresponding modulated output signal of the set of modulated output signals further includes modulating, by the corresponding QPSK modulator, the LO signal to generate the corresponding modulated output signal based on the digital data bits.

The digital data bits may indicate a phase state of the corresponding modulated output signal, the phase state being one of: 45, 135, 225, and 315 degrees.

In some embodiments, the desired modulated output signal corresponds to a symbol in a quadrature amplitude modulation (QAM) constellation generated based on: a number of equivalent transmitter units in the set of equivalent transmitter units, and a phase state of a corresponding modulated output signal of each equivalent transmitter unit of the set of equivalent transmitter units.

Figure 14:
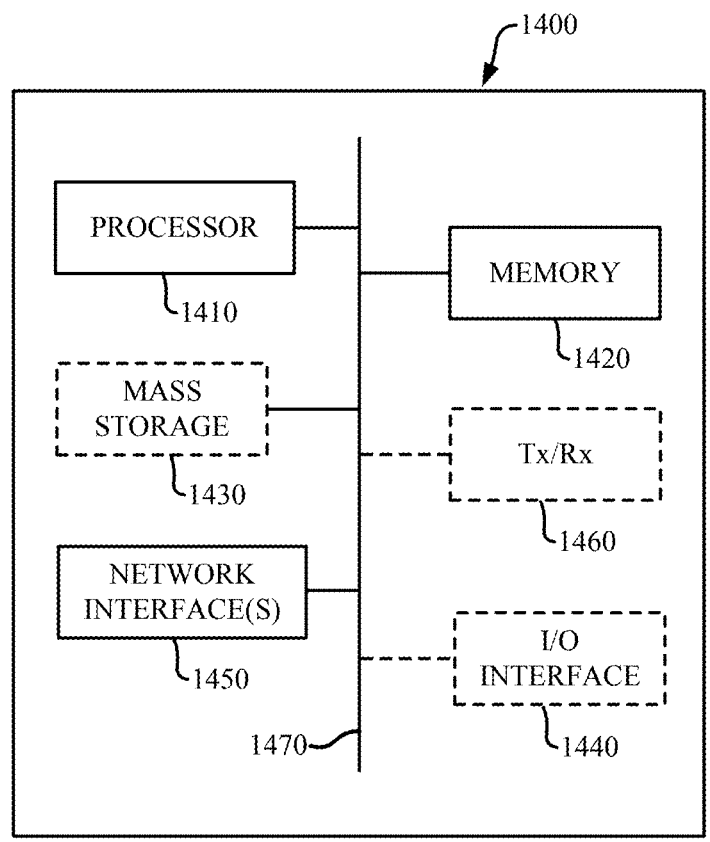
FIG. 14 illustrates an apparatus that may perform any or all of operations of the above methods and features explicitly or implicitly described herein, according to different embodiments of the present disclosure.

FIG. 14 illustrates an apparatus 1400 that may perform any or all of operations of the above methods and features explicitly or implicitly described herein, according to different aspects of the present disclosure. For example, a computer equipped with network function may be configured as the apparatus 1400. In some aspect, apparatus 1400 can be a device that connects to the network infrastructure over a radio interface, such as a mobile phone, smart phone or other such device that may be classified as user equipment (UE). In some aspects, apparatus 1400 may be a machine type communications (MTC) device (also referred to as a machine-to-machine (m2m) device), or another such device that may be categorized as a UE despite not providing a direct service to a user. In some aspects, apparatus 1400 may be component, module, device used to implement one or more components, modules, systems, mechanisms according to one or more aspects described herein. In some embodiments, apparatus 1400 may be a transmitter based on one or more topologies described herein.

As shown, the apparatus 1400 may include a processor 1410, such as a central processing unit (CPU) or specialized processors such as a graphics processing unit (GPU) or other such processor unit, memory 1420, non-transitory mass storage 1430, input-output interface 1440, network interface 1450, and a transceiver 1460, all of which are communicatively coupled via bi-directional bus 1470. Transceiver 1460 may include one or multiple antennas According to certain aspects, any or all of the depicted elements may be utilized, or only a subset of the elements. Further, apparatus 1400 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multi-chip modules, substrates or the like, or a combination thereof may be employed for performing the required logical operations.

The memory 1420 may include any type of non-transitory memory such as static random-access memory (SRAM), dynamic random-access memory (DRAM), synchronous DRAM (SDRAM), read-only memory (ROM), any combination of such, or the like. The mass storage element 1430 may include any type of non-transitory storage device, such as a solid-state drive, hard disk drive, a magnetic disk drive, an optical disk drive, USB drive, or any computer program product configured to store data and machine executable program code. According to certain aspects, the memory 1420 or mass storage 1430 may have recorded thereon statements and instructions executable by the processor 1410 for performing any method operations described herein.

The processor 1410 and memory 1420 may function together as a chipset which may be provided together for installation into wireless communication apparatus 1400 in order to implement WLAN functionality. The chipset may be configured to receive as input data including but not limited to PPDUs from the network interface 1450. The chipset may be configured to output data including but not limited to PPDUs to the network interface 1450.

Aspects of the present disclosure can be implemented using electronics hardware, software, or a combination thereof. In some aspects, this may be implemented by one or multiple computer processors executing program instructions stored in memory. In some aspects, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A transmitter array comprising:
a plurality of equivalent transmitter units;
each equivalent transmitter unit including an antenna and a quadrature phase shift keying (QPSK) modulator;
each equivalent transmitter unit selectively activatable; and
upon activation of a set of equivalent transmitter units selected from the plurality of equivalent transmitter units, a desired modulated output signal is generated, wherein each equivalent transmitter unit of the set of equivalent transmitter units is selectively activated by modulating, via the corresponding QPSK modulator, a local oscillator (LO) signal to generate a corresponding modulated output signal.

2. The transmitter array of claim 1 further comprising one or more power generation units for generating an LO signal at each equivalent transmitter unit of the plurality of equivalent transmitter units, wherein:
the plurality of equivalent transmitter units is organized into one or more groups of equivalent transmitter units, each group of equivalent transmitter units comprising one or more equivalent transmitter units and corresponding to a power generation unit of the one or more power generation units; and
each equivalent transmitter unit of each group of equivalent transmitter units is configured to receive the LO signal of the power generation unit corresponding to said each group of equivalent transmitter units.

3. The transmitter array of claim 1, wherein each equivalent transmitter unit of the plurality of equivalent transmitter units further comprises a power generation unit for generating the LO signal at said each equivalent transmitter unit.

4. The transmitter array of claim 1, wherein each equivalent transmitter unit of the plurality of equivalent transmitter units further comprises a power amplifier for amplifying an output of the corresponding QPSK modulator.

5. The transmitter array of claim 1, wherein the selective activation of each equivalent transmitter unit of the set of equivalent transmitter units is based on receiving, at the corresponding QPSK modulator, digital data bits for modulating the LO signal, the digital data bits indicating a phase state of the corresponding modulated output signal, the phase state being one of: 45, 135, 225, and 315 degrees.

6. The transmitter array of claim 1, wherein the desired modulated output signal corresponds to a symbol in a quadrature amplitude modulation (QAM) constellation generated based on: a number of equivalent transmitter units in the set of equivalent transmitter units, and a phase state of the corresponding modulated output signal of each equivalent transmitter unit of the set of equivalent transmitter units.

7. The transmitter array of claim 1, wherein:
each equivalent transmitter unit of the plurality of equivalent transmitter units is configured to generate an equivalent output power when activated; or
upon activation of the set of equivalent transmitter units, the transmitter array is further configured to selectively deactivate remaining equivalent transmitter units from the plurality of equivalent transmitter units that are not in the activated set.

8. A method of generating a desired modulated output signal, the method comprising:
receiving a plurality of local oscillator (LO) signals at a transmitter array, the transmitter array comprising a plurality of equivalent transmitter units, each equivalent transmitter unit selectively activatable and comprising an antenna and a quadrature phase shift keying (QPSK) modulator; and
selectively activating a set of equivalent transmitter units of the plurality of equivalent transmitter units to generate the desired modulated output signal, said selectively activating comprising, for each equivalent transmitter unit of the set of equivalent transmitter units, modulating, via the corresponding QPSK modulator, an LO signal of the plurality of LO signals to generate a corresponding modulated output signal.

9. The method of claim 8, wherein selectively activating the set of equivalent transmitter units of the plurality of equivalent transmitter units to generate the desired modulated output signal comprises:
combining a set of modulated output signals to generate the desired modulated output signal, the set of modulated output signals comprising the corresponding modulated output signal of each equivalent transmitter unit of the set of equivalent transmitter units.

10. The method of claim 9, wherein the plurality of LO signals is received from one or more power generation units.

11. The method of claim 10, wherein:
the plurality of equivalent transmitter units is organized into one or more groups of equivalent transmitter units, each group of equivalent transmitter units comprising one or more equivalent transmitter units and corresponding to a power generation unit of the one or more power generation units; and
receiving the plurality of LO signals at the transmitter array comprises:
receiving, at each equivalent transmitter unit of each group of equivalent transmitter units, an LO signal of the plurality of LO signals from the power generation unit corresponding to said each group of equivalent transmitter units.

12. The method of claim 8, wherein:
each equivalent transmitter unit of the plurality of equivalent transmitter units further comprises a power generation unit; and
receiving the plurality of LO signals at the transmitter array comprises:
receiving, at each equivalent transmitter unit of the plurality of equivalent transmitter units, an LO signal from the corresponding power generation unit.

13. The method of claim 8, wherein each equivalent transmitter unit of the plurality of equivalent transmitter units further comprises a power amplifier for amplifying an output of the corresponding QPSK modulator.

14. The method of claim 8, wherein selectively activating the set of equivalent transmitter units of the plurality of equivalent transmitter units to generate the desired modulated output signal comprises:
receiving, at the corresponding QPSK modulator of said each equivalent transmitter unit of the set of equivalent transmitter units, digital data bits for modulating the LO signal of the plurality of LO signals to selectively activate said each equivalent transmitter unit; and modulating, by the corresponding QPSK modulator, the LO signal to generate the corresponding modulated output signal based on the digital data bits, the digital data bits indicating a phase state of the corresponding modulated output signal, the phase state being one of: 45, 135, 225, and 315 degrees.

15. The method of claim 8, wherein the desired modulated output signal corresponds to a symbol in a quadrature amplitude modulation (QAM) constellation generated based on: a number of equivalent transmitter units in the set of equivalent transmitter units, and a phase state of the corresponding modulated output signal of each equivalent transmitter unit of the set of equivalent transmitter units.

16. An apparatus comprising at least one processor and at least one non-transitory machine-readable medium storing executable instructions which when executed by the at least one processor configure the apparatus for:
receiving a plurality of local oscillator (LO) signals at a transmitter array, the transmitter array comprising a plurality of equivalent transmitter units, each equivalent transmitter unit selectively activatable and comprising an antenna and a quadrature phase shift keying (QPSK) modulator; and
selectively activating a set of equivalent transmitter units of the plurality of equivalent transmitter units to generate a desired modulated output signal, said selectively activating comprising, for each equivalent transmitter unit of the set of equivalent transmitter units, modulating, via the corresponding QPSK modulator, an LO signal of the plurality of LO signals to generate a corresponding modulated output signal.

17. The apparatus of claim 16, wherein selectively activating the set of equivalent transmitter units of the plurality of equivalent transmitter units to generate a desired modulated output signal comprises:
combining a set of modulated output signals to generate the desired modulated output signal, the set of modulated output signals comprising the corresponding modulated output signal of each equivalent transmitter unit of the set of equivalent transmitter units.

18. The apparatus of claim 16, wherein:
the plurality of LO signals is received from one or more power generation units;
the plurality of equivalent transmitter units is organized into one or more groups of equivalent transmitter units, each group of equivalent transmitter units comprising one or more equivalent transmitter units and corresponding to a power generation unit of the one or more power generation units; and
receiving the plurality of LO signals at the transmitter array comprises: receiving, at each equivalent transmitter unit of each group of equivalent transmitter units, an LO signal of the plurality of LO signals from the power generation unit corresponding to said each group of equivalent transmitter units.

19. The apparatus of claim 16, wherein selectively activating the set of equivalent transmitter units of the plurality of equivalent transmitter units to generate the desired modulated output signal comprises:
receiving, at the corresponding QPSK modulator of said each equivalent transmitter unit of the set of equivalent transmitter units, digital data bits for modulation to selectively activate said each equivalent transmitter unit; and
modulating, by the corresponding QPSK modulator, an LO signal to generate the corresponding modulated output signal based on the digital data bits, the digital data bits indicating a phase state of the corresponding modulated output signal, the phase state being one of: 45, 135, 225, and 315 degrees.

20. The apparatus of claim 16, wherein the desired modulated output signal corresponds to a symbol in a quadrature amplitude modulation (QAM) constellation generated based on: a number of equivalent transmitter units in the set of equivalent transmitter units, and a phase state of the corresponding modulated output signal of each equivalent transmitter unit of the set of equivalent transmitter units.

* * * * *